(12) United States Patent
Suenaga et al.

(10) Patent No.: US 8,213,328 B2
(45) Date of Patent: Jul. 3, 2012

(54) COMMUNICATION INFORMATION ACQUISITION CREATION SYSTEM, NETWORK SWITCH, AND NETWORK SWITCH EVALUATION METHOD

(75) Inventors: Yoshifumi Suenaga, Odawara (JP); Yoshio Odagiri, Fujisawa (JP); Masaru Ootsu, Hadano (JP)

(73) Assignee: Hitachi, Ltd., Tokyo (JP)

( * ) Notice: Subject to any disclaimer, the term of this patent is extended or adjusted under 35 U.S.C. 154(b) by 355 days.

(21) Appl. No.: 12/526,622

(22) PCT Filed: Apr. 10, 2009

(86) PCT No.: PCT/JP2009/001676
§ 371 (c)(1),
(2), (4) Date: Aug. 10, 2009

(87) PCT Pub. No.: WO2010/116420
PCT Pub. Date: Oct. 14, 2010

(65) Prior Publication Data
US 2011/0194422 A1    Aug. 11, 2011

(51) Int. Cl.
*H04L 12/26* (2006.01)
(52) U.S. Cl. ............................ 370/252; 370/401; 714/37
(58) Field of Classification Search .................. 370/252, 370/253, 400, 401, 463; 714/37, 45
See application file for complete search history.

(56) References Cited

U.S. PATENT DOCUMENTS

| 2005/0025193 | A1 | 2/2005 | Fike |
| 2005/2408822 | | 10/2005 | Miyamoto |
| 2008/0059844 | A1 | 3/2008 | Miyamoto |

FOREIGN PATENT DOCUMENTS

| EP | 1 175 078 | 1/2002 |
| EP | 1 760 939 | 3/2007 |
| JP | 2005-301640 | 10/2005 |

OTHER PUBLICATIONS

International Search Report in International Application No. PC/JP2009/001676 mailed Jan. 12, 2010.
Written Opinion in International Application No. PC/JP2009/001676 mailed Jan. 12, 2010.

*Primary Examiner* — Pao Sinkantarakorn
(74) *Attorney, Agent, or Firm* — Brundidge & Stanger, P.C.

(57) ABSTRACT

The present invention provides a communication information acquisition creation system 50 used for evaluating a network switch 4 which includes multiple communication ports 41. The communication information acquisition creation system 50 acquires first communication information input to a first communication port and second communication information input to a second communication port, then acquires from the first and the second communication information time information 1011 which is the time when each information has been acquired, transmitting source information 1012 which shows each transmitting source, and destination information 1013 which shows each destination, stores the communication data in which each piece of the above-mentioned information corresponds with each other, creates communication information for evaluation to be input to the communication port 41 of the network switch 4 with reference to the stored communication information, and transmits the created communication information for evaluation to the communication ports 41 specified by the transmitting source information and the destination information in the order shown by the time information.

13 Claims, 19 Drawing Sheets

[Fig. 1]
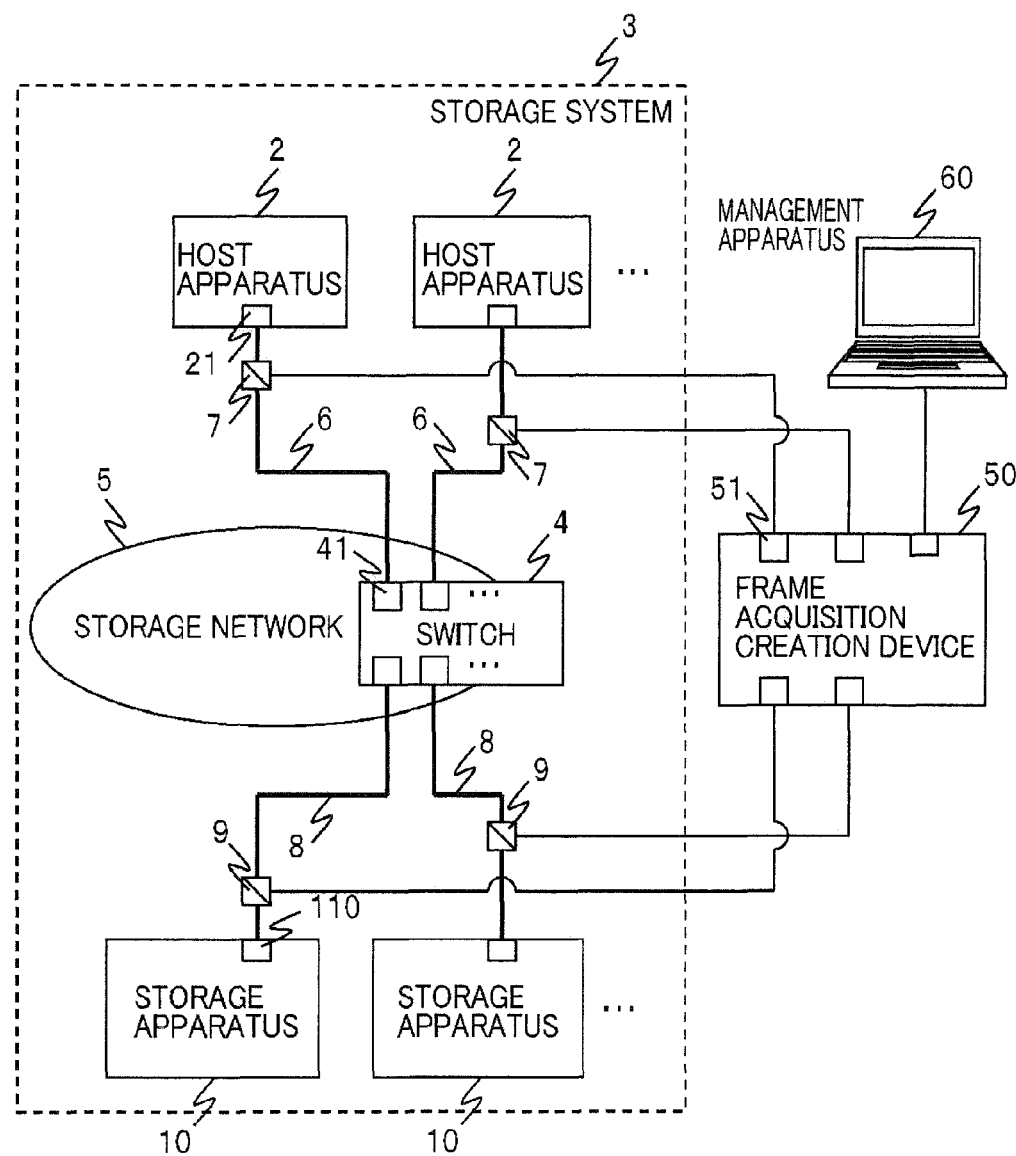

[Fig. 2]
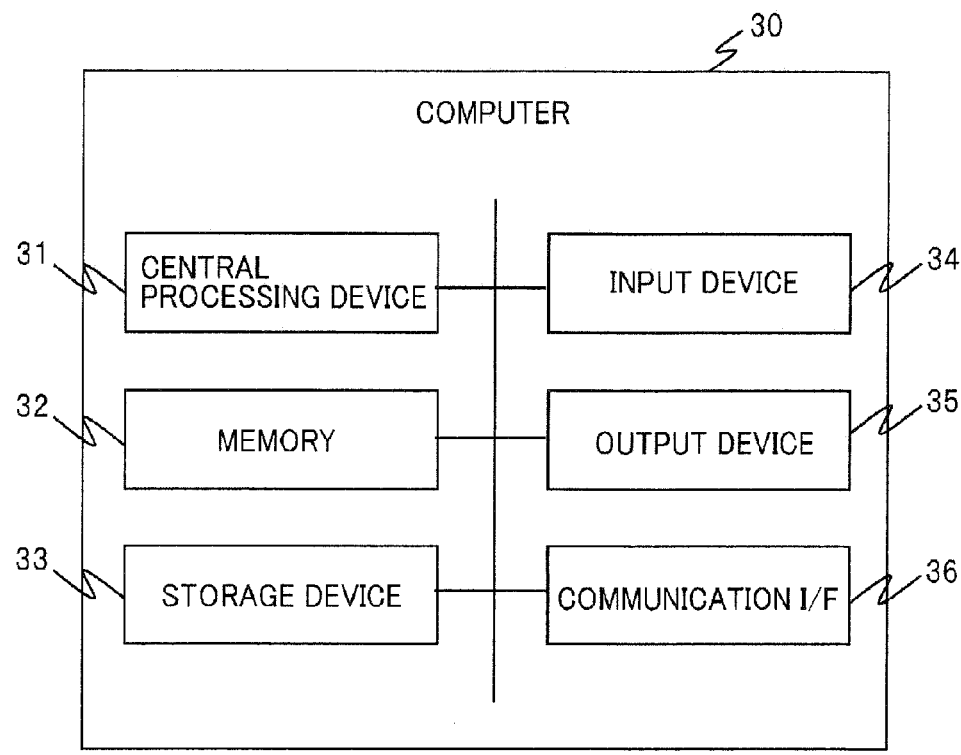

[Fig. 3]
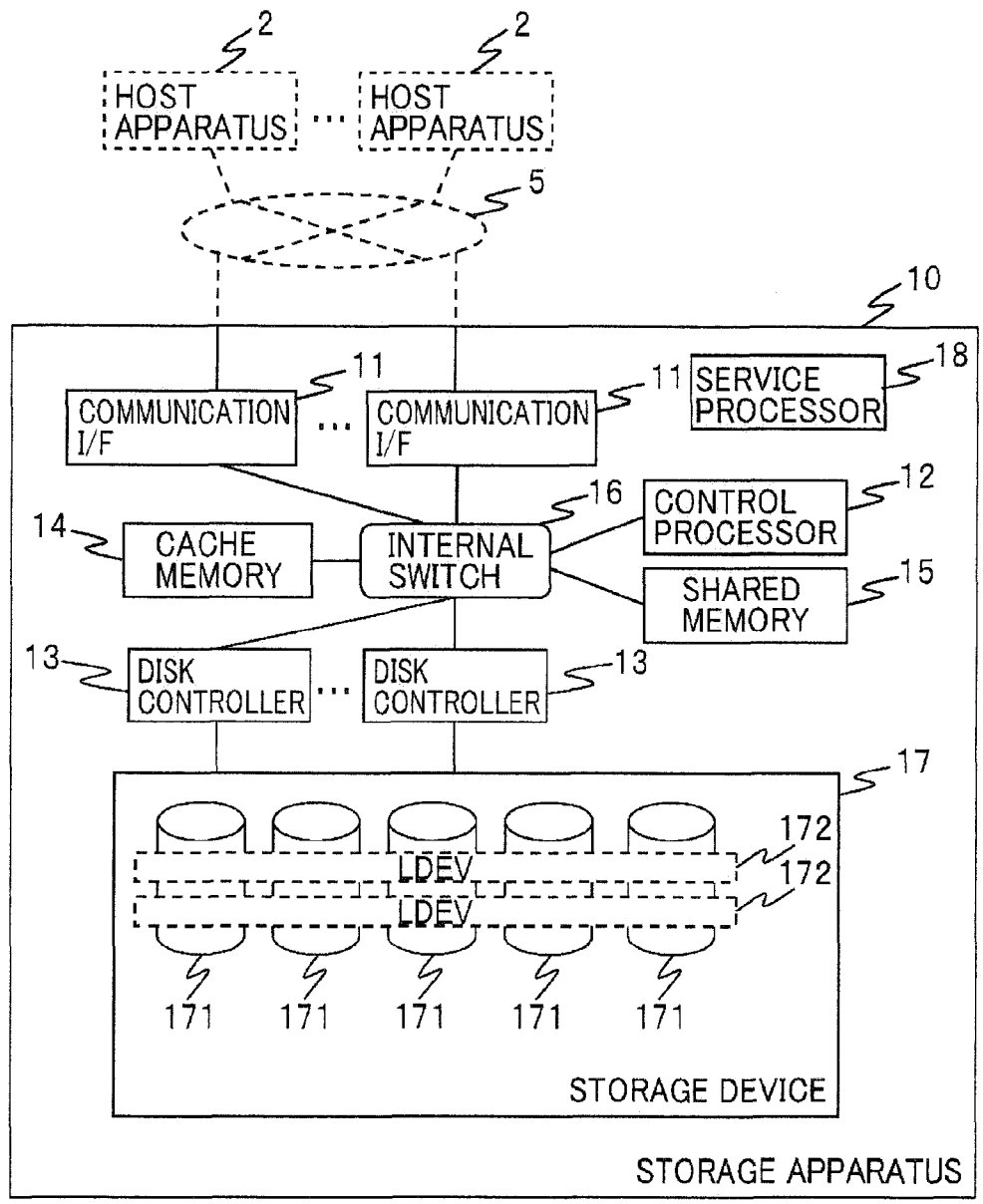

[Fig. 4A]
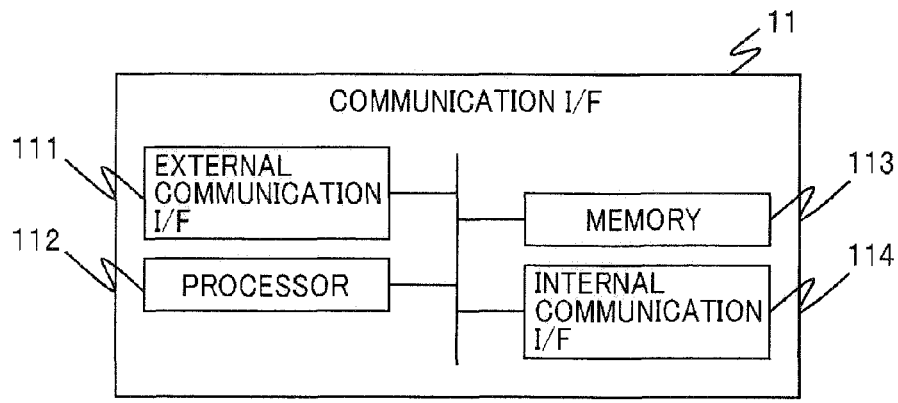
[Fig. 4B]
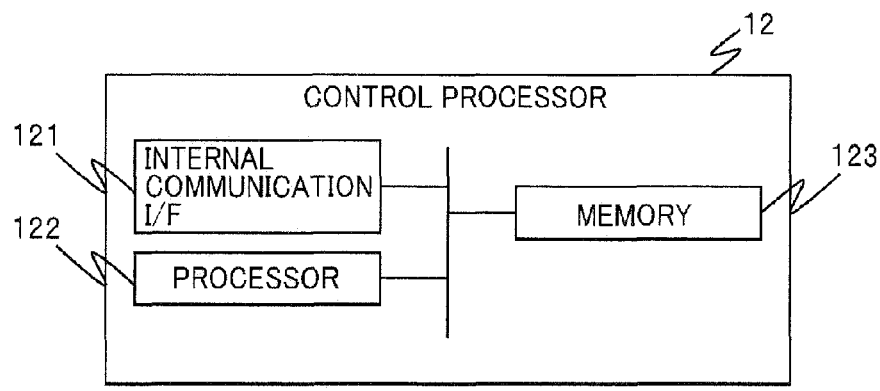
[Fig. 4C]
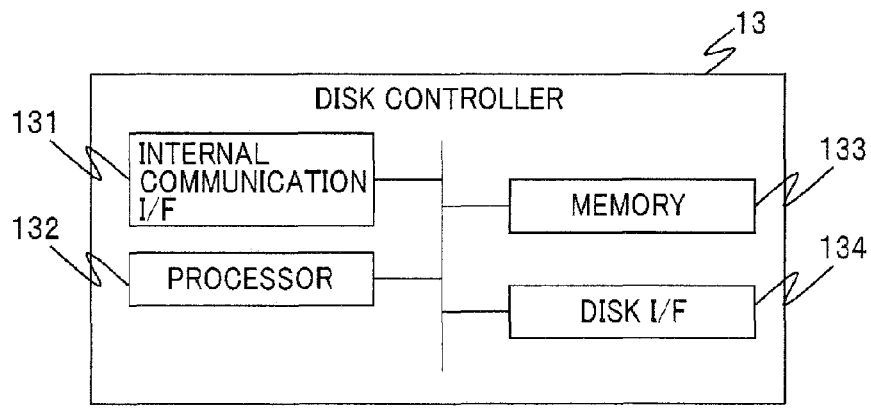

[Fig. 5]
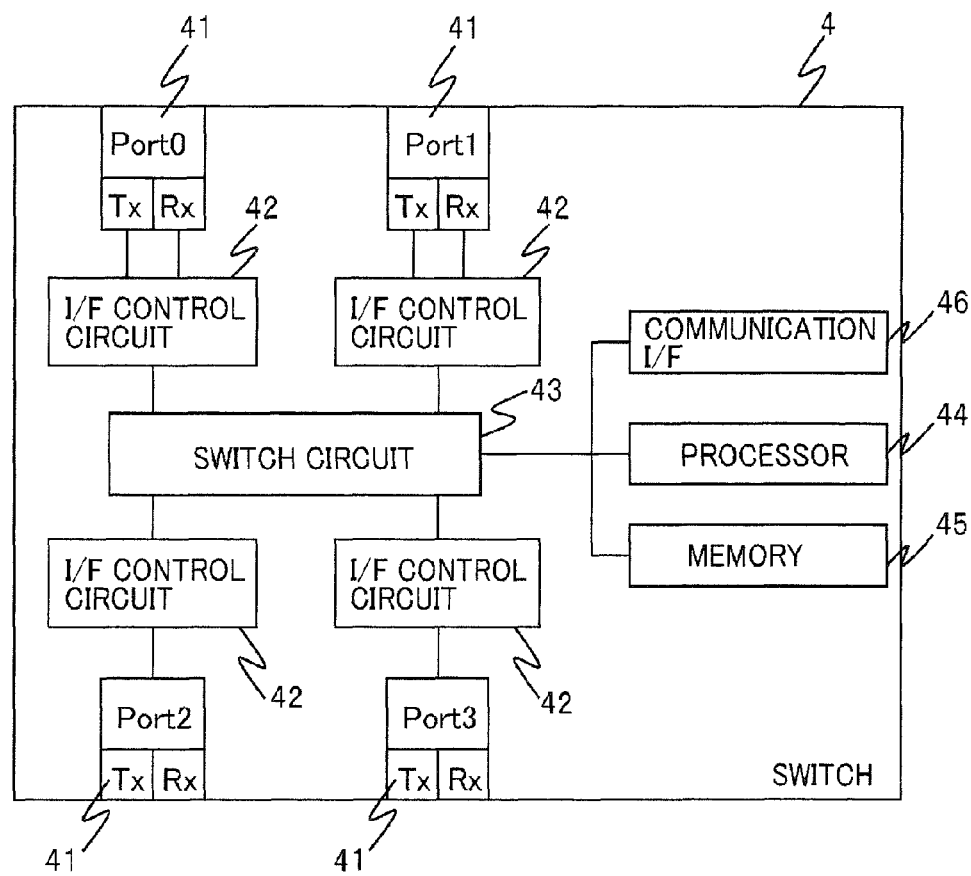

[Fig. 6]
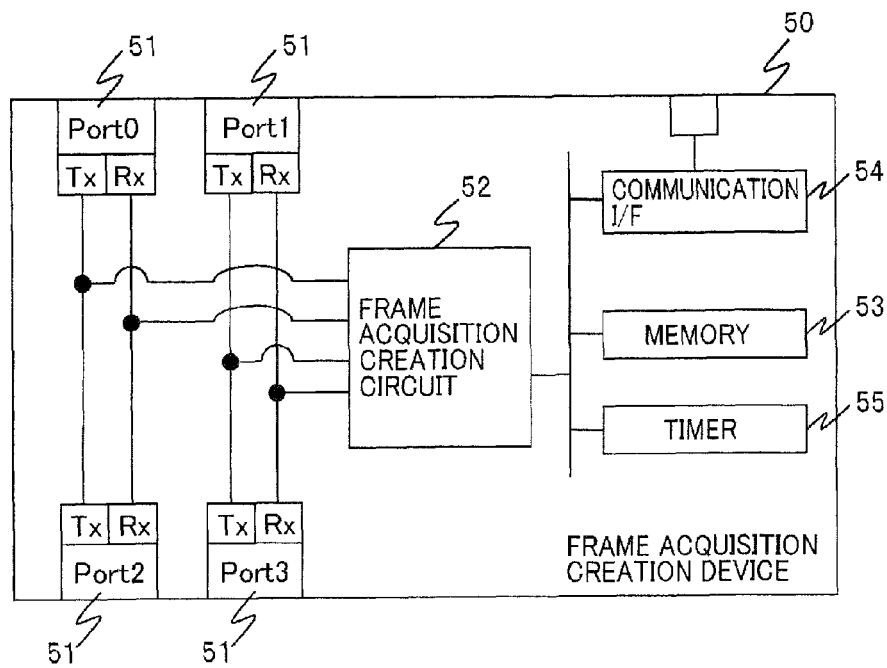
[Fig. 7]
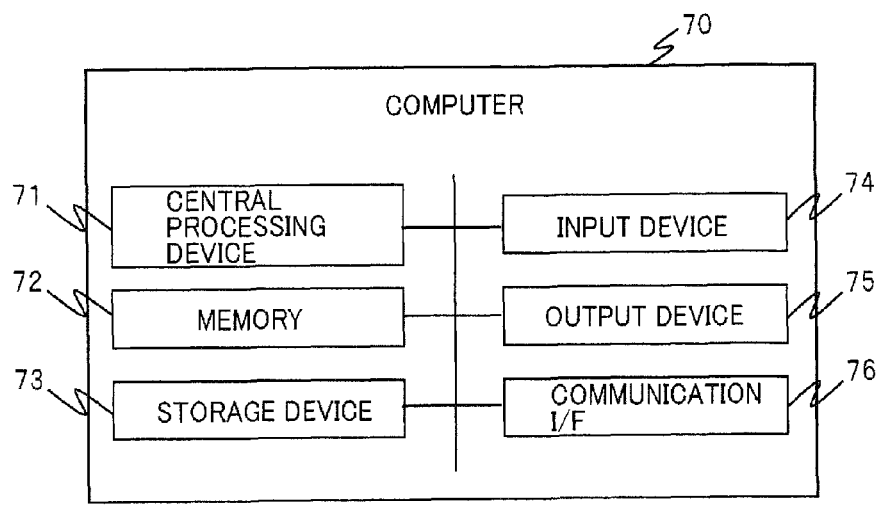

[Fig. 8]
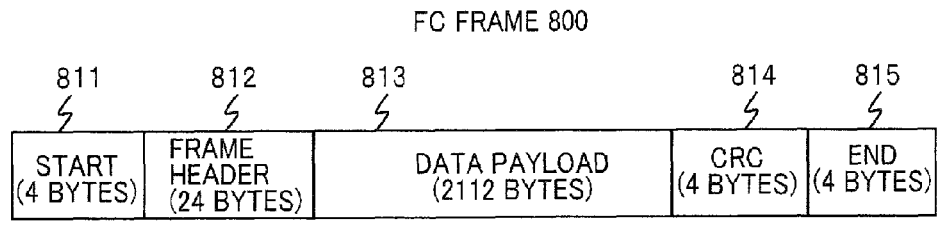
[Fig. 9]
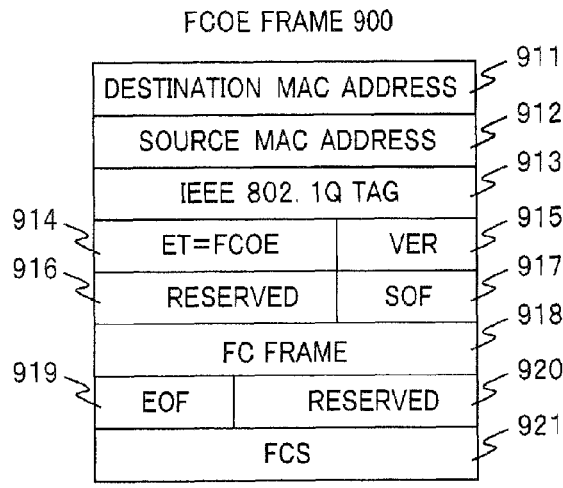
[Fig. 10]
FRAME INFORMATION 1000
| TIME | INPUT PORT | OUTPUT PORT | FRAME TYPE |
|---|---|---|---|
| 00:00:00 | PORT0 | PORT2 | WRITE |
| 00:00:10 | PORT2 | PORT0 | X_RDY |
| 00:00:15 | PORT0 | PORT2 | DATA |
| 00:00:18 | PORT0 | PORT2 | DATA |
| 00:00:20 | PORT0 | PORT2 | DATA |
| 00:00:22 | PORT0 | PORT2 | DATA |
| 00:00:24 | PORT0 | PORT2 | DATA |
| ⋮ | ⋮ | ⋮ | ⋮ |
| 00:01:20 | PORT2 | PORT0 | GOOD |
| 00:01:25 | PORT0 | PORT2 | READ |

[Fig. 11]
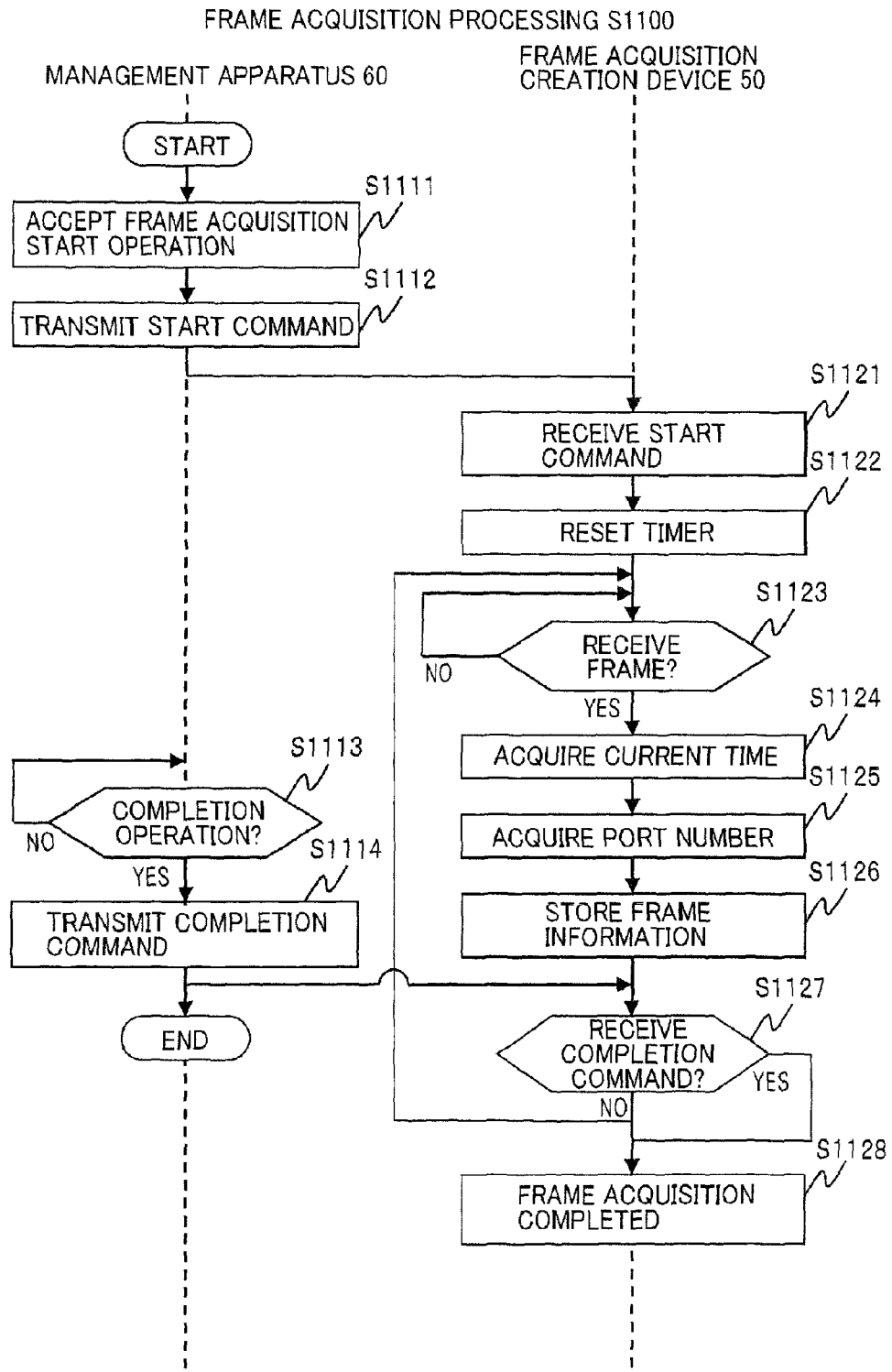

[Fig. 12A]
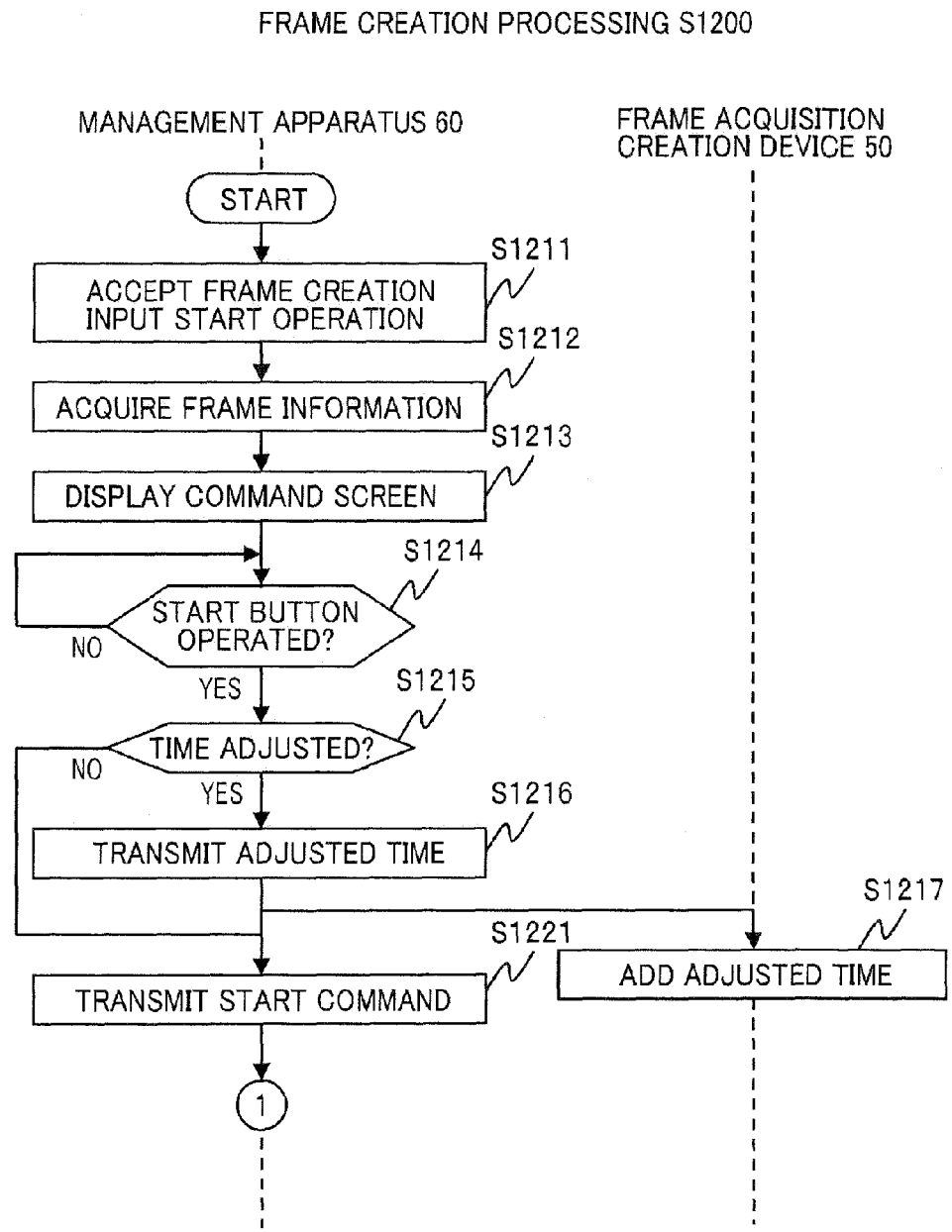

[Fig. 12B]
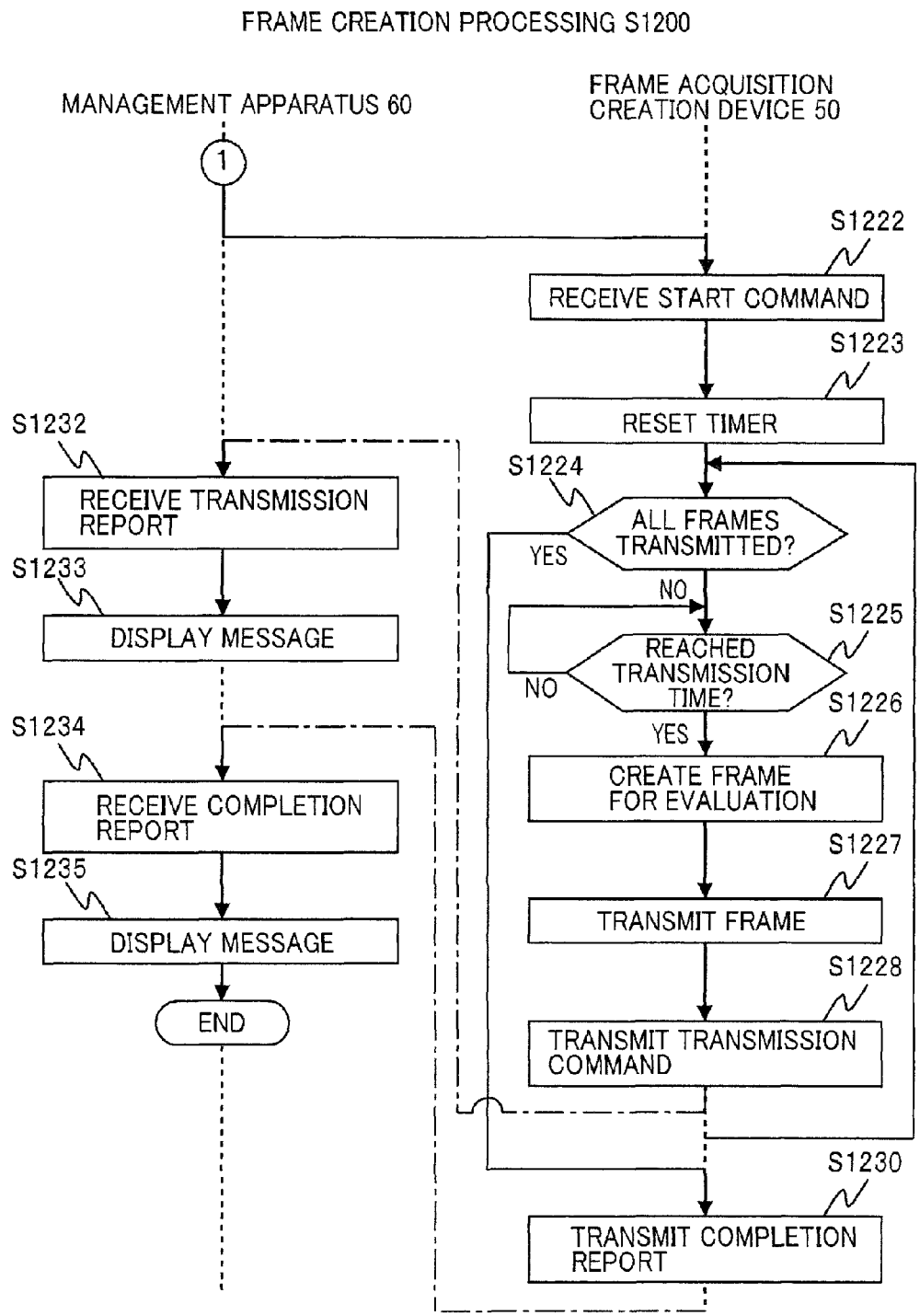

[Fig. 13A]
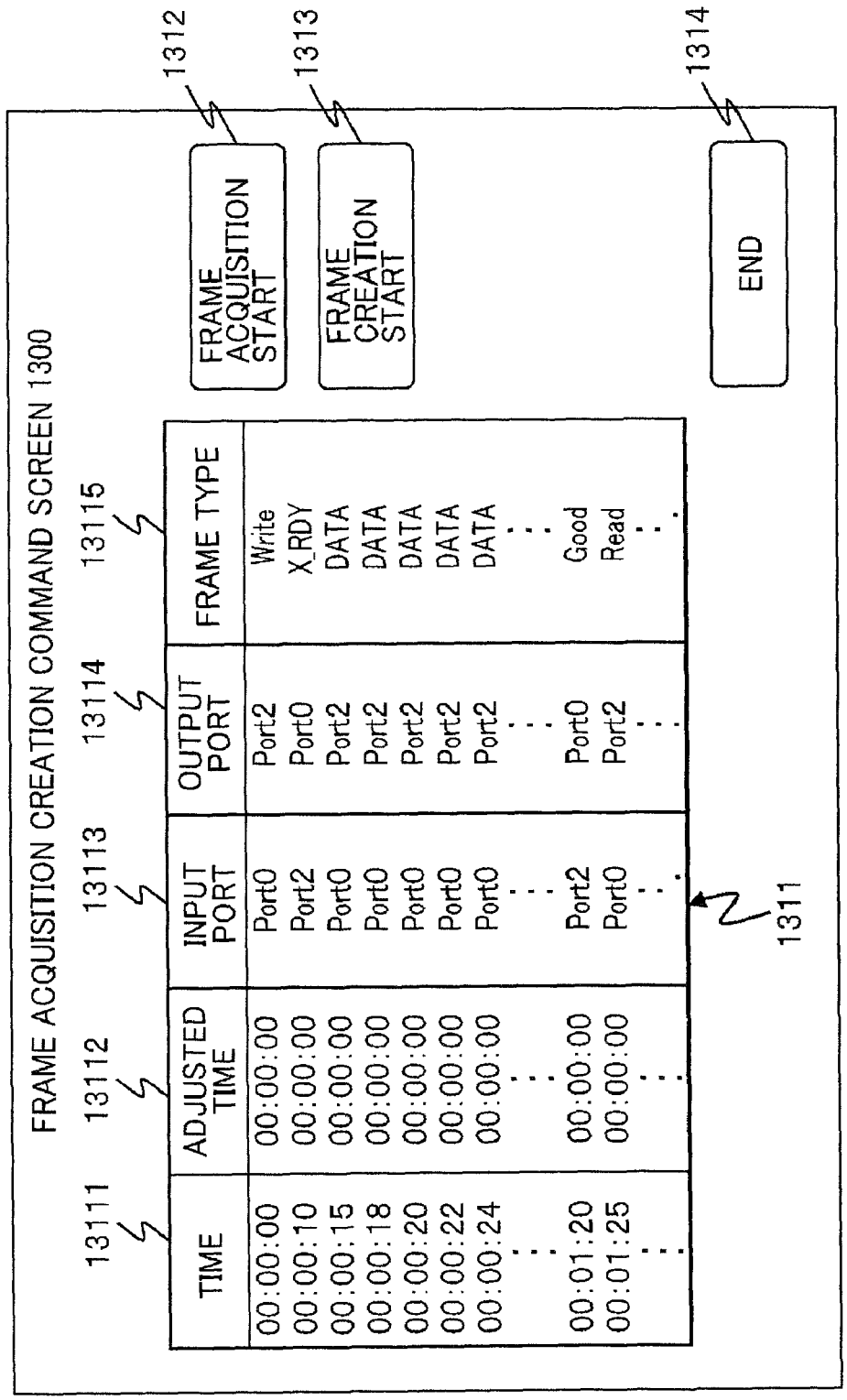

[Fig. 13B]

TRANSMISSION FRAME INFORMATION 1350

| TRANSMISSION TIME | INPUT PORT | OUTPUT PORT | FRAME TYPE |
|---|---|---|---|
| 00:00:00 | Port0 | Port2 | Write |
| 00:00:10 | Port2 | Port0 | X_RDY |
| 00:00:15 | Port0 | Port2 | DATA |
| 00:00:18 | Port0 | Port2 | DATA |
| 00:00:20 | Port0 | Port2 | DATA |
| 00:00:22 | Port0 | Port2 | DATA |
| 00:00:24 | Port0 | Port2 | DATA |
| ⋮ | ⋮ | ⋮ | ⋮ |
| 00:01:20 | Port2 | Port0 | Good |
| 00:01:25 | Port0 | Port2 | Read |
| ⋮ | ⋮ | ⋮ | ⋮ |

1351  1352  1353  1354

[Fig. 14]
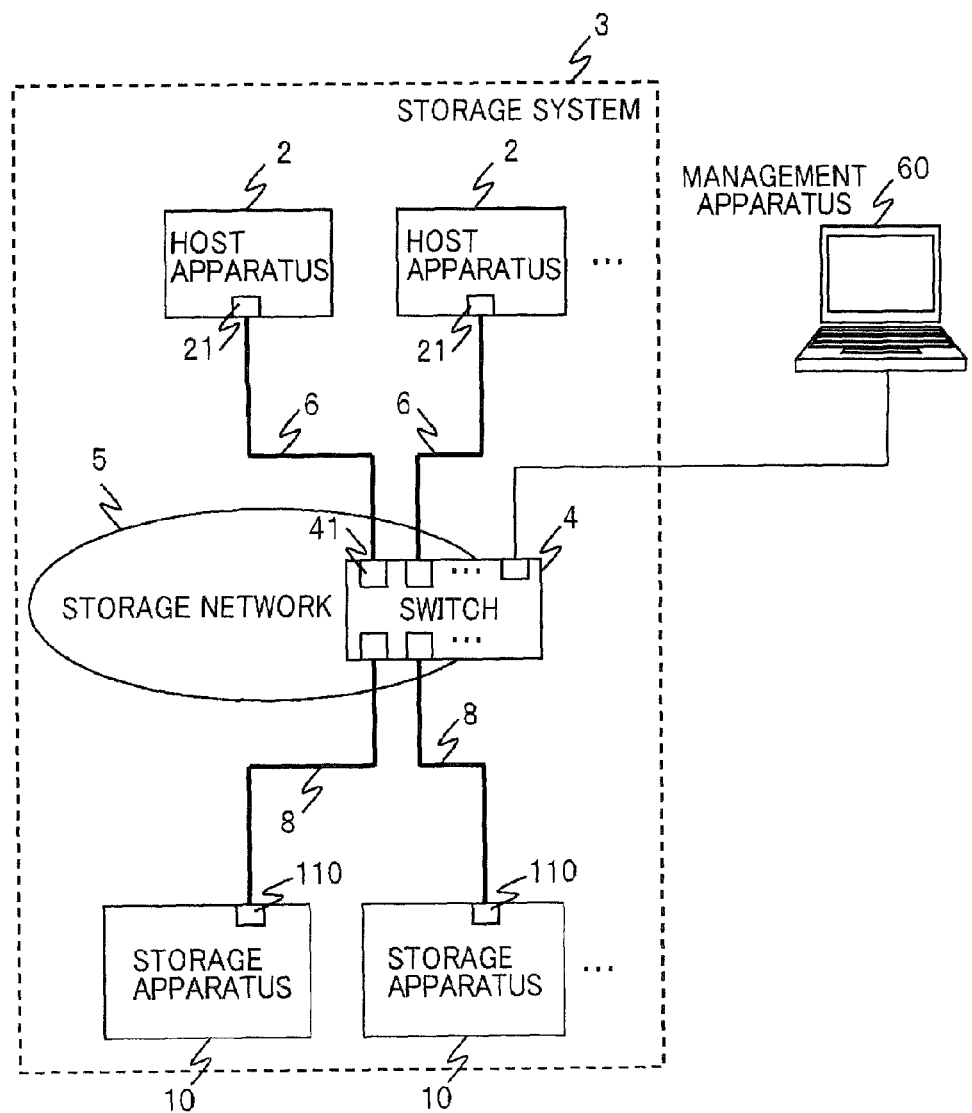

[Fig. 15]
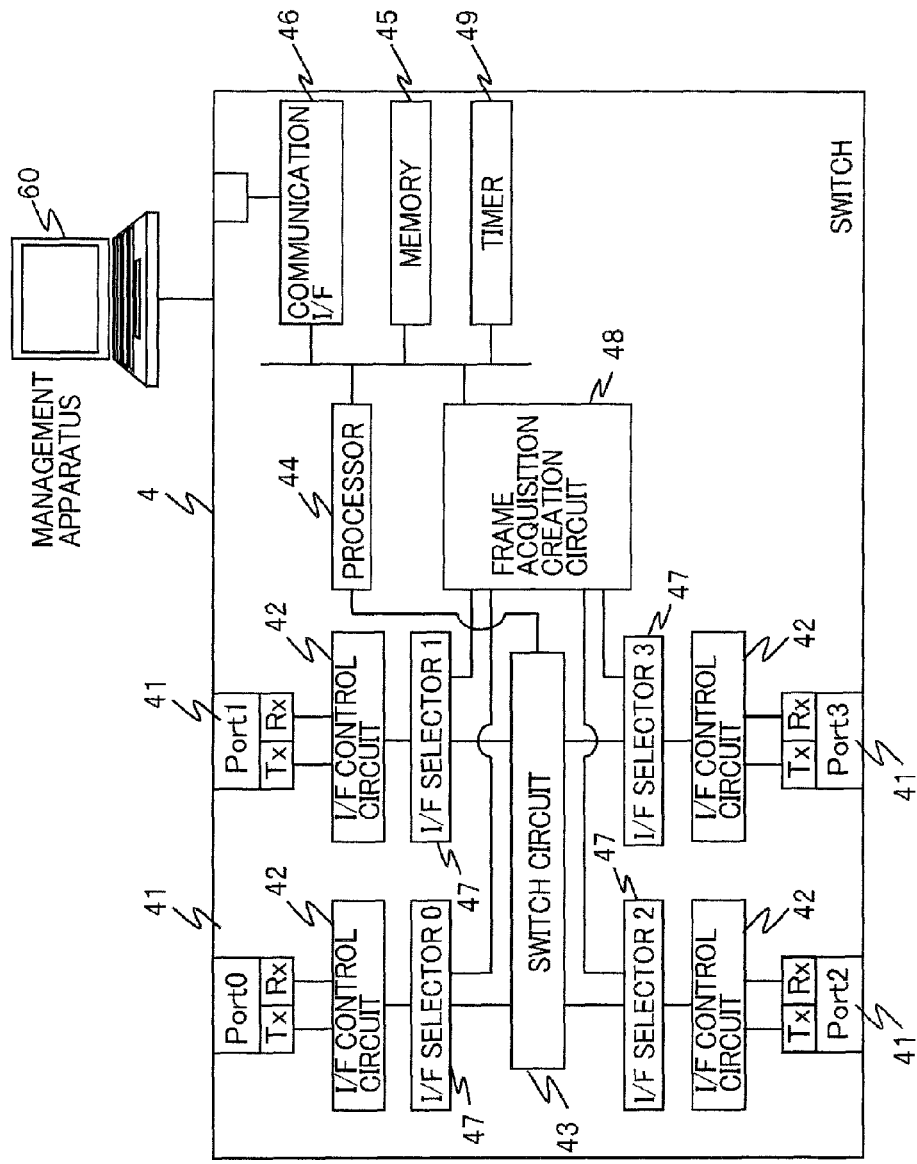

[Fig. 16A]
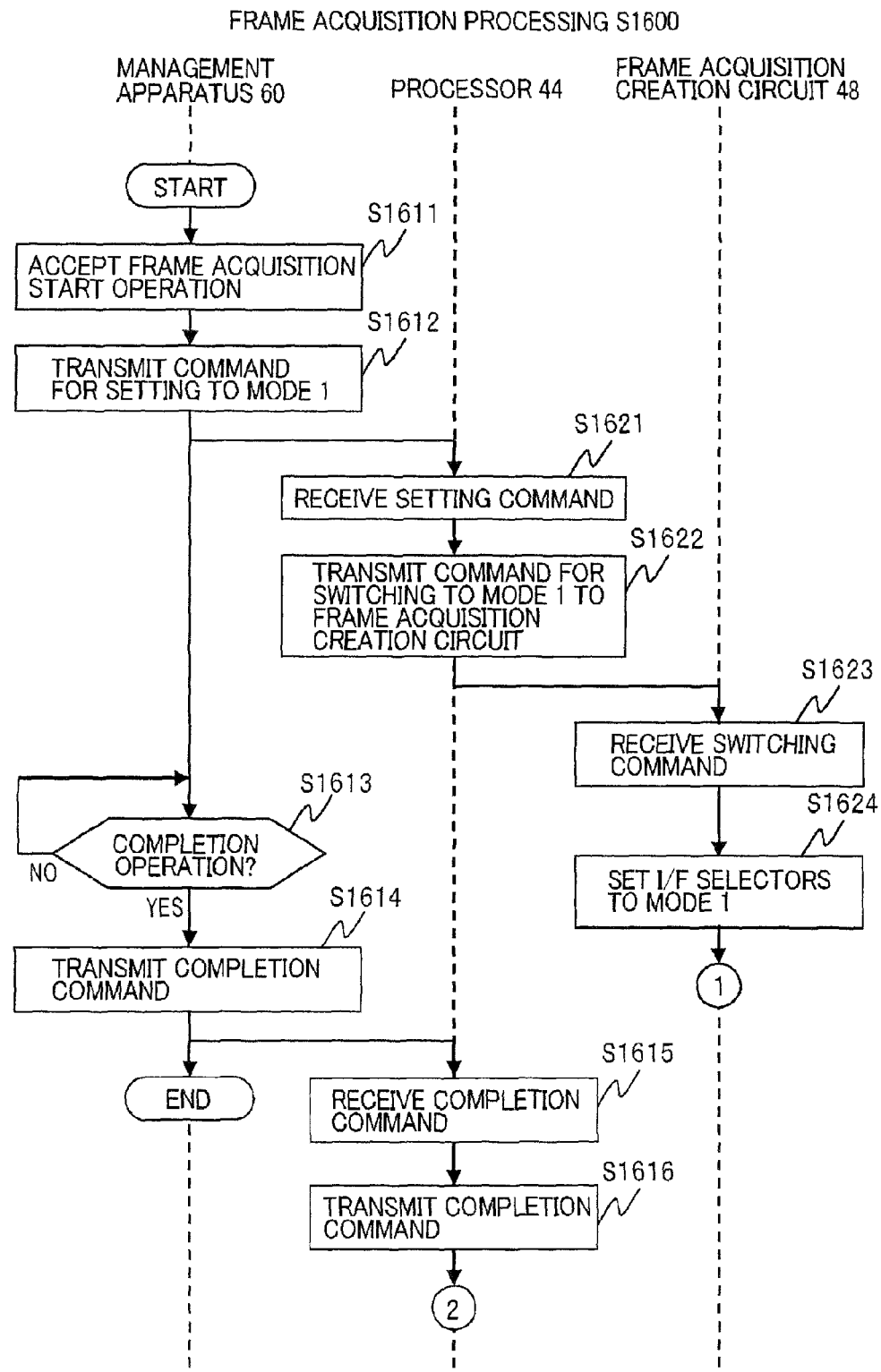

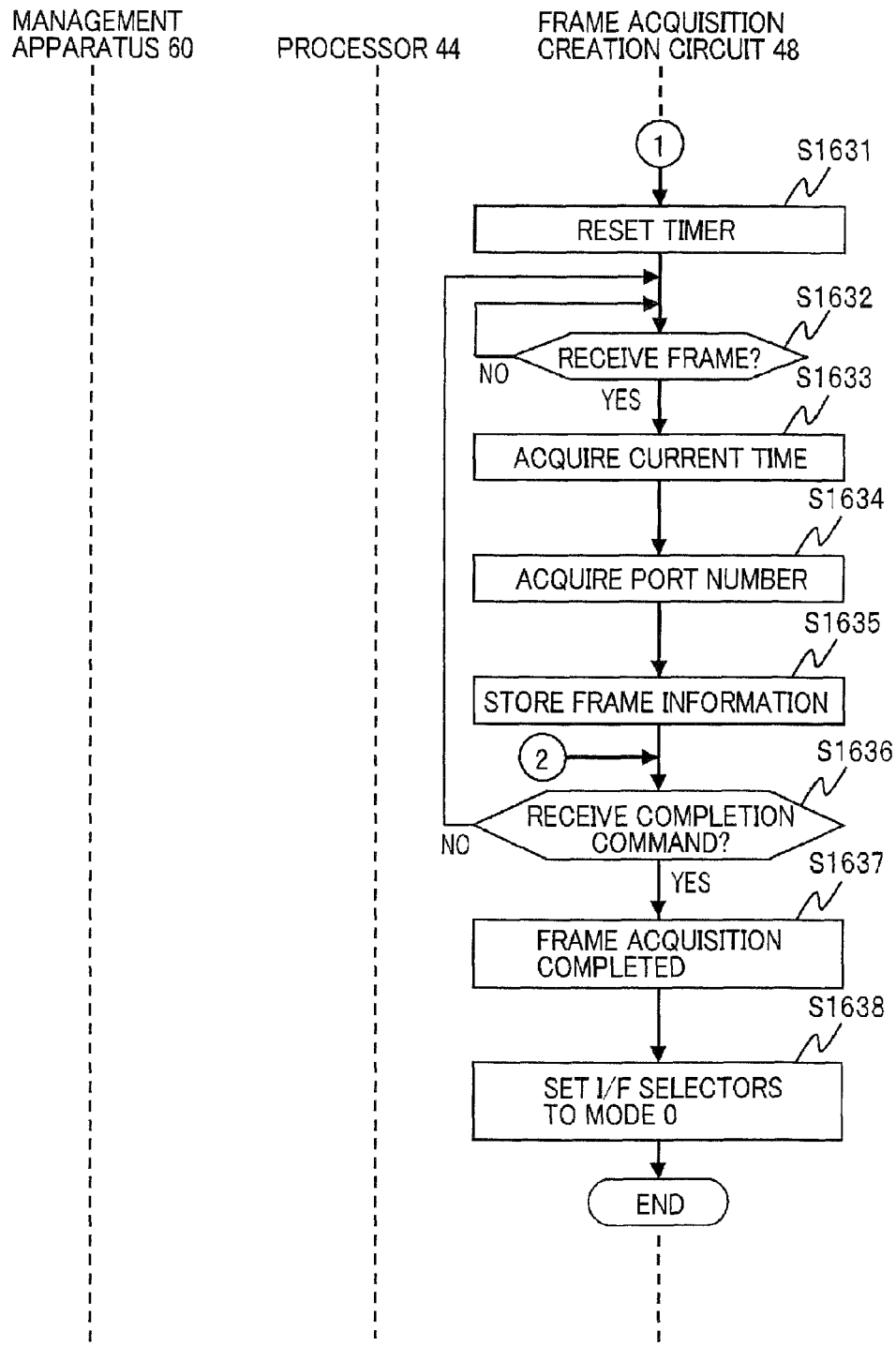

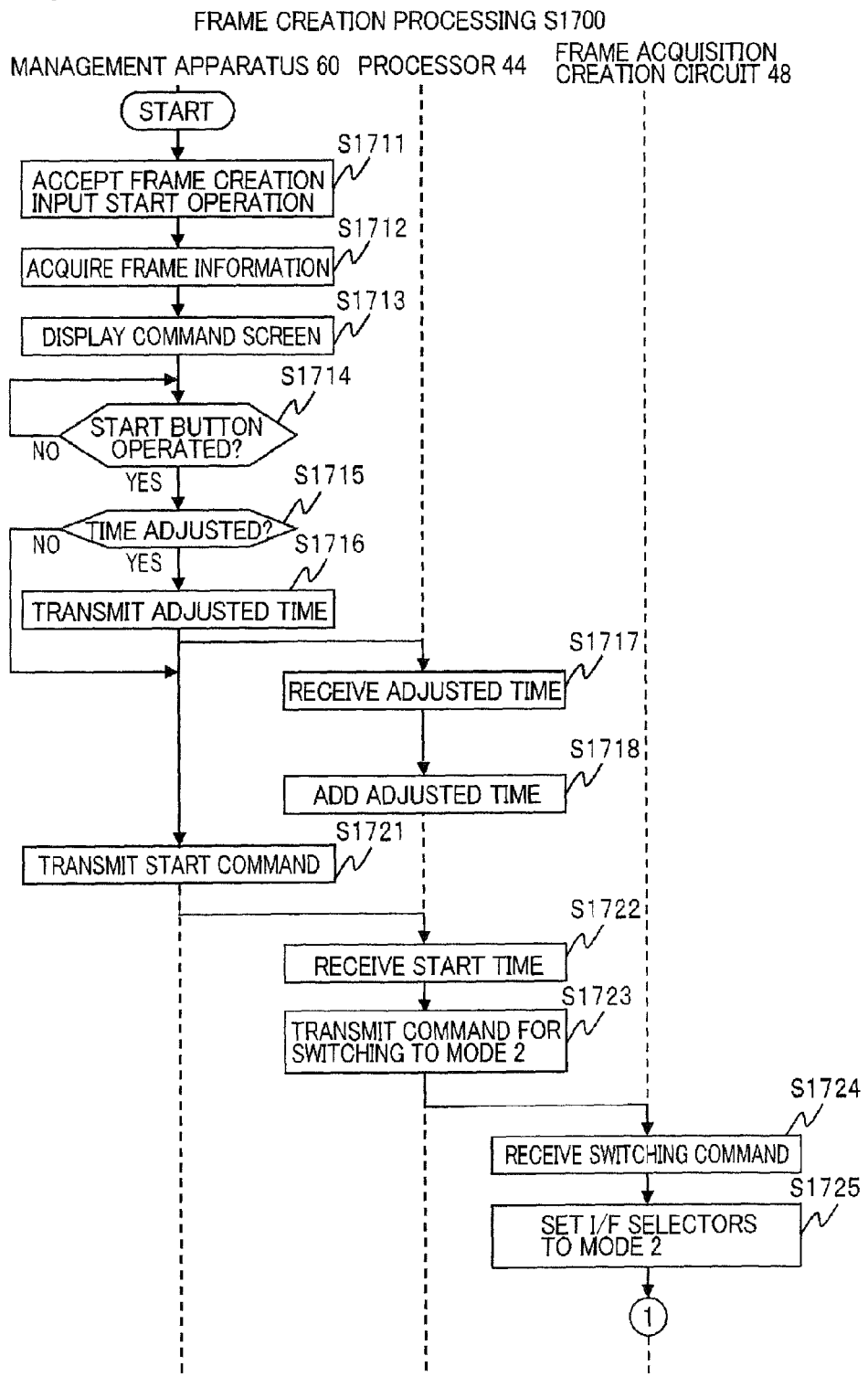

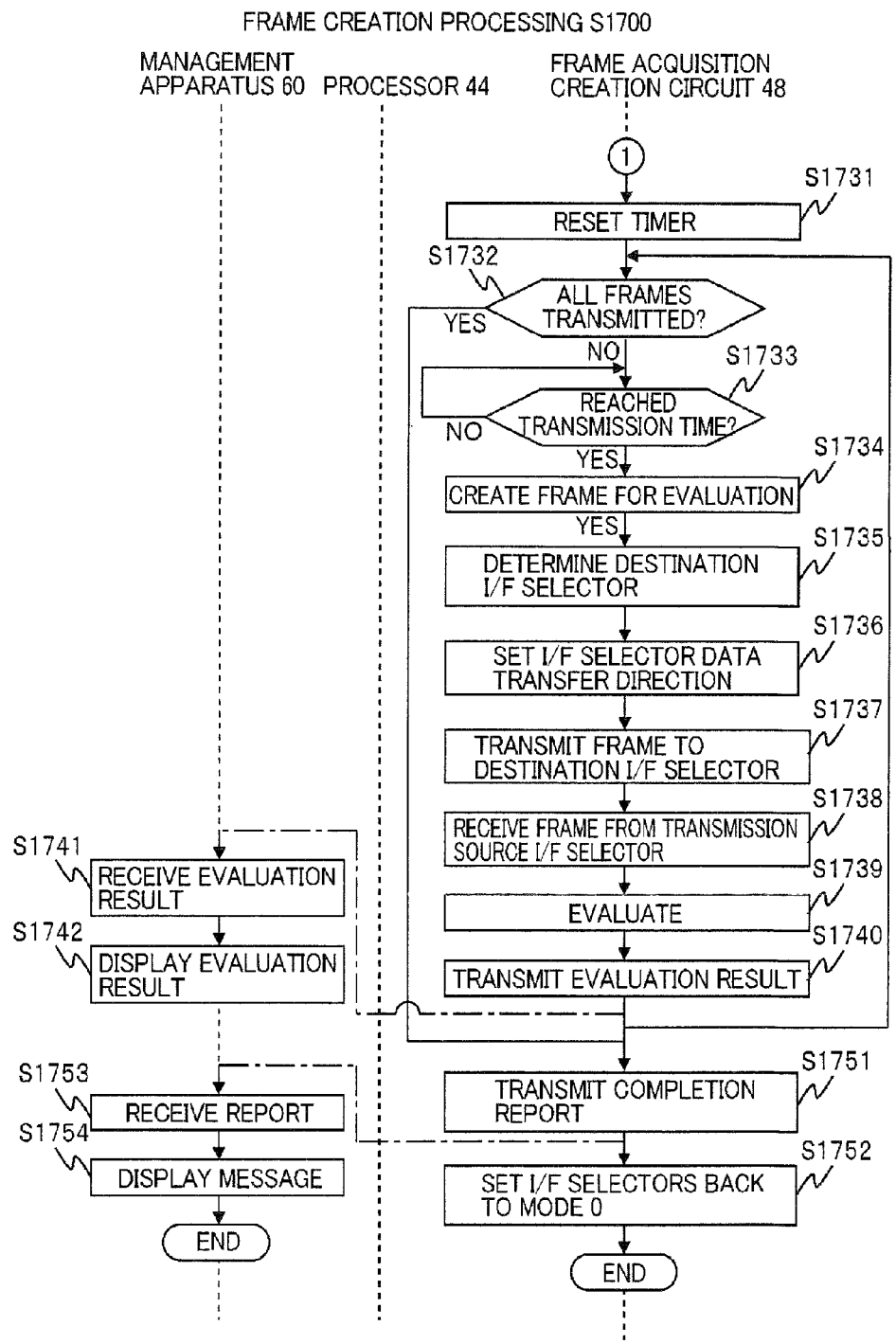
[Fig. 17B]

[Fig. 18]

EVALUATION RESULT 1800

| TRANSMISSION TIME (1811) | RECEPTION TIME (1812) | INPUT PORT (1813) | OUTPUT PORT (1814) | FRAME TYPE (1815) | EVALUATION RESULT (1816) |
|---|---|---|---|---|---|
| 00:00:00 | 00:00:00 | Port0 | Port2 | Write | OK |
| 00:00:10 | 00:00:10 | Port2 | Port0 | X_RDY | OK |
| 00:00:15 | 00:00:15 | Port0 | Port2 | DATA | OK |
| 00:00:18 | 00:00:18 | Port0 | Port2 | DATA | OK |
| 00:00:20 | 00:00:20 | Port0 | Port2 | DATA | OK |
| 00:00:22 | 00:00:22 | Port0 | Port2 | DATA | Error |
| 00:00:24 | – | Port0 | Port2 | DATA | Time-out |
| ⋮ | ⋮ | ⋮ | ⋮ | ⋮ | ⋮ |
| 00:01:20 | 00:01:20 | Port2 | Port0 | Good | OK |
| 00:01:25 | 00:01:25 | Port0 | Port2 | Read | OK |
| ⋮ | ⋮ | ⋮ | ⋮ | ⋮ | ⋮ |

COMMUNICATION INFORMATION ACQUISITION CREATION SYSTEM, NETWORK SWITCH, AND NETWORK SWITCH EVALUATION METHOD

TECHNICAL FIELD

This invention relates to a communication information acquisition creation system, a network switch, and a network switch evaluation method, and to a technology for reliable evaluation of a network switch by re-creating a network switch environment at operational sites of an information processing system.

BACKGROUND ART

In a storage system configured of a storage device such as a disk array device, for example, if a firmware of a Fibre Channel switch (hereinafter referred to as an FC-SW) is upgraded, a coupling test (evaluation) is performed for an environment including the FC-SW. If a failure occurs in the storage system, the cause of the failure is analyzed by re-creating the situation where the failure has occurred.

Patent Citation 1 states that, if the cause of the failure that has occurred in a SAN (Storage Area Network) environment is hard to identify, analyzers are set, one between the server and an FC-SW, and the other between the FC-SW and the RAID system (RAID: Redundant Arrays of Inexpensive (or Independent) Disks), by which the same environment is created as at the time of the failure and the cause of the failure is identified with reference to the analysis result by the analyzers, and that the data that passes through the FC-SW is accumulated in the FC-SW buffer as trace data, which is transmitted to storage devices when the requirements for trace data transmission are satisfied, such as no data frames existing in the SAN.

CITATION LIST

Patent Literature

PTL 1: Japanese Patent Application Laid-open Publication No. 2005-301640

SUMMARY OF INVENTION

Technical Problem

If the firmware of the FC-SW configuring the storage system in operation has been upgraded or the FC-SW is replaced, it is preferable to perform an evaluation (test) using the data that actually passes through the FC-SW, at the operational site of the storage system. Meanwhile, if the cause of what is called an intermitted failure (i.e. a failure which tends to depend on the operational environment and occurs less frequently) and other failures which occur in the storage system must be identified, the network switch environment at the operational site must be re-created as accurately as possible, using the data that has actually passed through the FC-SW.

The present invention has been intended, in view of these problems, for providing a communication information acquisition creation system, a network switch, and a network switch evaluation method for reliable evaluation of a network switch by re-creating the network switch environment at operational sites.

Solution to Problem

One aspect of the present invention for solving the above-mentioned and other problems is a communication information acquisition creation system for evaluating a network switch having a plurality of communication ports, the network switch outputting first communication information to a second communication device coupled to a second one of the communication ports, the first communication information transmitted from a first communication device and input to a first one of the communication ports, comprising a communication information acquisition unit acquiring the first communication information input to the first communication port and second communication information input to the second communication port, a communication data storage unit acquiring, from the first communication information and the second communication information respectively, time information indicating time of acquisition of the first and second communication information, transmitting source information indicating transmission sources of the first and second communication information, and transmitting destination information indicating transmission destinations of the first and second communication information, and storing communication data being information correlating the time information, the transmitting source information, and the transmitting destination information, a communication information creation unit creating, according to the communication data, communication information for evaluation to be input to the communication port of the network switch, and a communication information output unit inputting the created communication information for evaluation to the communication port of the network switch, the communication port specified by the transmitting source information and the transmitting destination information in the order determined according to the time information.

According to the present invention, a communication information acquisition creation system acquires the communication information input to the network switch and stores the communication data with reference to the communication information. The system creates the communication information with reference to the stored communication data, and inputs the created communication information for evaluation to the communication ports of the network switch in the order of the time information. According to the communication information acquisition creation system in the present invention, for example, the communication information input to the network switch at an operational site during an actual operation can be provided to the network switch in chronological order of actual input of communication information. Therefore, the actual situation for the network switch can be re-created appropriately at an operational site, and the cause of the failure can be identified immediately and reliably. Furthermore, the network switch status (such as performance and presence of failure) can be evaluated appropriately.

Note that the first or second communication information is provided to the communication information acquisition creation system by setting, for example, a first splitter between the first communication device and the first communication port and a second splitter between the second communication device and the second communication port. As above-mentioned, according to the communication information acquisition creation system of the present invention, a network switch can be evaluated, hardly affecting the environment of the network switch to be evaluated.

Note that the first communication device is, for example, a host apparatus, the second communication device is, for example, a storage apparatus that the host apparatus accesses, and the network switch is, for example, a constituent component on a network communicatively coupling the host apparatus and the storage apparatus. Furthermore, the communication information is a unit of data transfer (data frame)

specified as the communication protocol for the first and the second communication devices to communicate with each other. The above-mentioned communication protocols include, for example, FC (Fibre Channel) and FCoE (Fibre Channel over Ethernet).

Another aspect of the present invention is a network switch comprising a plurality of communication ports, a switch circuit selecting one of a plurality of paths between the communication ports, the network switch outputting first communication information to a second communication device coupled to a second one of the communication ports, the first communication information transmitted from a first communication device and input to a first one of the communication ports, a communication information acquisition unit acquiring the first communication information input to the first communication port and second communication information input to the second communication port, a communication data storage unit acquiring, from the first communication information and the second communication information respectively, time information indicating time of acquisition of the first and second communication information, transmitting source information indicating transmission sources of the first and second communication information, and transmitting destination information indicating transmission destinations of the first and second communication information, and storing communication data being information correlating the time information, the transmitting source information, and the transmitting destination information, a communication information creation unit creating, according to the communication data, communication information for evaluation to be input to the communication port of the network switch, and a communication information output unit inputting the created communication information for evaluation to the communication port of the network switch, the communication port specified by the transmitting source information and the transmitting destination information in the order determined according to the time information.

The functions of the above-mentioned communication information acquisition unit, the communication data storage unit, the communication information creation unit, and the communication information output unit can be embedded in the network switch. This enables network switch evaluation to be performed at an operational site of the information processing system, without affecting the operational environment. Note that, in this case, the above-mentioned network switch may be configured to include a communication information acquisition creation circuit acquiring the communication information input to the communication port, creating the communication information by the communication information creation unit, and outputting the created communication information for evaluation to the switch circuit by the communication information output unit, a selector controlling a data flow between the communication port, the communication information acquisition creation circuit, and the switch circuit according to an instruction from the communication information acquisition creation circuit, the selector being provided to each of the communication ports. When the communication information acquisition creation circuit acquires the communication information, the communication information acquisition creation circuit controls the selector so that the communication information to be input to the communication port is output to both the communication information acquisition creation circuit and the switch circuit, and, when the communication information acquisition creation circuit outputs the communication information for evaluation to the switch circuit, the communication information acquisition creation circuit controls the selector so that the communication information to be input to the communication port is output to the switch circuit.

In the network switch, further, an evaluation communication information acquisition unit can be installed which acquires communication information for evaluation which the communication information output unit has output to the switch circuit. In this case, the communication information acquisition creation circuit, when acquiring evaluation communication information, controls the selector so that the communication information for evaluation output by the switch circuit is output to the communication information acquisition creation circuit. Meanwhile, in the network switch, a communication interface for coupling a user interface, to the network switch, for changing timing when the communication information output unit transmits the communication information for evaluation to the communication port can be installed. This enables the user to specify various patterns of communication information (test patterns) depending on the methods and purposes of network switch evaluation.

Furthermore, in a network switch, a communication interface to couple a user interface to compare the communication information for evaluation output to the switch circuit by the communication information output unit with the communication information for evaluation output by the switch circuit, to store the result as the evaluation result, and to refer to the evaluation result can be installed. This enables the user to ascertain the result of the network switch evaluation easily and simply.

The other problems and the solution for the same disclosed by the present invention are described by the embodiments and the accompanying drawings.

Advantageous Effects of Invention

According to the present invention, a network switch can be evaluated easily and reliably by re-creating the network switch environment at an operational site.

BRIEF DESCRIPTION OF DRAWINGS

FIG. 1 is a diagram showing an information processing system 1 according to Example 1.
FIG. 2 is a hardware example of a host apparatus 2.
FIG. 3 is a hardware example of a storage system 10.
FIG. 4A is a hardware example of a communication I/F 11.
FIG. 4B is a hardware example of a control processor 12.
FIG. 4C is a hardware example of a disk controller 13.
FIG. 5 is a hardware example of a switch 4.
FIG. 6 is a hardware example of a frame acquisition creation device 50.
FIG. 7 is a hardware example of a management apparatus 60.
FIG. 8 is an example of a frame flowing in the switch 4.
FIG. 9 is an example of a frame flowing in the switch 4.
FIG. 10 is an example of frame information 1000.
FIG. 11 is a flowchart showing a frame acquisition processing S1100.
FIG. 12A is a flowchart showing a frame creation processing S1200.
FIG. 12B is a flowchart showing a frame creation processing S1200.
FIG. 13A is an example of a frame acquisition creation command screen 1300.
FIG. 13B is an example of transmitted frame information 1350 displayed by the management apparatus 60.
FIG. 14 is a diagram showing the configuration of an information processing system 1 according to Example 2.

FIG. 15 is a hardware example of a switch 4 according to Example 2.

FIG. 16A is a flowchart showing a frame acquisition processing S1600.

FIG. 16B is a flowchart showing a frame acquisition processing S1600.

FIG. 17A is a flowchart showing a frame creation processing S1700.

FIG. 17B is a flowchart showing a frame creation processing S1700.

FIG. 18 is an example of an evaluation result displayed by the management apparatus 60.

DESCRIPTION OF EMBODIMENTS

The embodiments of the present invention are described below in details, referring to the accompanying drawings.

Example 1

The brief configuration of an information processing system 1 according to Example 1 is shown in FIG. 1. As shown in the figure, this information processing system 1 includes a host apparatus 2 (a server), a storage apparatus 10, a storage network 5 configured by using a network switch (hereinafter referred to as a switch 4), a frame acquisition creation device 50 (communication information acquisition creation system) and a management apparatus 60. The host apparatus 2 and the storage apparatus 10 are coupled communicatively via the storage network 5, constructing a storage system 3. The information processing system 1 is established in a data center as an operational site or a vendor company where the information processing systems 1 are evaluated (tested).

The frame acquisition creation device 50 is coupled to the storage network 5. As shown in FIG. 1, on a communication cable 6 (communication line) coupling a communication port 21 of a host apparatus 2 and a communication port 41 of the switch 4, a splitter 7 (a first splitter) providing the frame acquisition creation device 50 with a duplication (split signal) of a data frame (hereinafter referred to as a frame) which is a data transfer unit following a specific communication protocol that flows in the relevant communication cable 6 (first communication information). Meanwhile, on a communication cable 8 (communication line) coupling a communication port 41 of the switch 4 and a communication port 110 of the storage system 10, a splitter 9 (a second splitter) which provides the frame acquisition creation device 50 with a duplication (split signal) of a frame that flows in the relevant communication cable 8 (second communication information).

The communication cable 6 (or 8) is a metal cable which conveys electrical signals or an optical (multimode or single-mode) fiber which transports an optical signal. If the communication cable 6 (or 8) is a metal cable, the splitter 7 (or 9) is a splitter of electrical signals. Meanwhile, if the communication cable 6 (or 8) is an optical cable (optical fiber), the splitter 7 (or 9) is, for example, a beam splitter (optical splitter). For splitters 7 and 9, signal amplifiers are installed if necessary.

Host Apparatus

A host apparatus 2 is an information processing device (computer) which transmits I/O requests and accesses the storage area provided by a storage system 10. A host apparatus 2 includes, for example, a personal computer, a workstation and a mainframe. In the host apparatus 2, application software such as a bank ATM system, an airline reservation system, a settlement account information system, and a billing system operates. The host apparatus 2 can function as, for example, a NAS (Network Attached Storage).

A hardware example of the host apparatus 2 is shown in FIG. 2. As shown in the figure, a computer 30 includes a central processing device 31, a memory 32, a storage 33, an input device 34, an output device 35 and a communication interface (hereinafter referred to as a communication I/F) 36. The central processing device 31 is configured by using, for example, a CPU (Central Processing Unit) or an MPU (Micro Processing Unit). The memory 32 is a RAM (Random Access Memory) or a ROM (Read Only Memory). The storage 33 is, for example, a hard disk or a semiconductor storage (SSD (Solid State Drive)). The input device 34 includes a keyboard, a mouse, or a touch panel. The output device 35 is, for example, a liquid crystal monitor or a printer. The communication I/F 36 is, for example, a MC (Network Interface Card) or an HBA (Host Bus Adaptor). Note that the communication I/F 36 includes a communication port 21 coupled to a communication port 41 included in the switch 4.

Storage System

A hardware example of the storage system 10 is shown in FIG. 3. As shown in the figure, this storage system 10 includes one or more communication interfaces (hereinafter referred to as a communication I/F) 11, one or more control processors 12 (Microprocessors), one or more disk controllers 13, a cache memory 14, a shared memory 15, an internal switch 16, a storage device 17, and a service processor 18. Among these, the communication I/F 11, the control processor 12, the disk controller 13, the cache memory 14, the shared memory 15 are coupled communicatively via the internal switch 16.

The communication I/F 11 receives I/O requests (data write requests and data read requests) transmitted from the host apparatus 2, and transmits responses for the received I/O requests (read data, data read completion reports, data write completion reports, etc.) to the host apparatus 2. The communication I/F 11 has protocol control function for the communication with the host apparatus 2.

The control processor 12 performs processing related to data transfer among, corresponding with the I/O requests received by the communication I/F 11, the communication I/F 11, the disk controller 13 and the cache memory 14. The control processor 12 performs, for example, exchange of the data (read from or written to the storage device 17) between the communication I/F 11 and the disk controller 13 via the cache memory 14, and for the data stored in the cache memory 14, staging (data read from the storage device 17) and destaging (data write to the storage device 17).

The cache memory 14 is configured by using a RAM (Random Access Memory) capable of high-speed access and other components. In the cache memory 14, for example, data to be written to the storage device 17 (hereinafter referred to as write data) and data read from the storage device 17 (hereinafter referred to as read data) are stored. In the shared memory 15, various types of information used for controlling the storage system 10 are stored.

The disk controller 13 communicates with the storage devices 17 when reading data from or writing data to the storage device 17.

The internal switch 16 is configured by using, for example, a high-speed crossbar switch. The communication via the internal switch 16 is performed according to the protocols of Fibre Channel, iSCSI (internet Small Computer System Interface), TCP/IP, etc.

The storage device 17 is configured of storage devices, such as hard disk drives 171 or semiconductor storages (SSDs). Note that a storage device 17 in this embodiment is supposed to be configured by using hard disk drives 171 of SAS (Serial Attached SCSI) and SATA (Serial ATA) types. The hard disk drives 171 are controlled according to the RAID (Redundant Arrays of Inexpensive (or Independent) Disks) control methods (such as RAID 0, 1, 5 or 6).

The storage device 17 provides a storage area in units of logical devices 172 (LDEV) configured by using storage areas provided by RAID (e.g. storage area of RAID groups (parity groups)). However, the unit of storage areas provided by the 17 is not limited to LDEVs.

A hardware example of a communication I/F 11 is shown in FIG. 4A. As shown in the figure, the communication I/F 11 includes an external communication interface (hereinafter referred to as an external communication I/F 111), a processor 112, a memory 113, and an internal communication interface (hereinafter referred to as an internal communication I/F 114). The external communication I/F 111 is, for example, a NIC or an HBA. The external communication I/F 111 includes a communication port 110 coupled to the communication port 41 of the switch 4.

The processor 112 is a CPU or an MPU. The memory 113 is RAM or ROM. The internal communication I/F 114 communicates with the control processor 12, the disk controllers 13, the cache memory 14 and the shared memory 15 via the internal switch 16.

A hardware example of a control processor 12 is shown in FIG. 4B. As shown in the figure, the control processor 12 includes an internal communication interface (hereinafter referred to as an internal communication I/F 121), a processor 122 and memory 123. The internal communication I/F 121 communicates with the internal communication I/F 11, the disk controllers 13, the cache memory 14 and the shared memory 15 via the internal switch 16. The processor 122 is a CPU, an MPU or a DMA (Direct Memory Access) etc. The memory 123 is RAM or ROM.

A hardware example of a disk controller 13 is shown in FIG. 4C. As shown in the figure, the disk controller 13 includes an internal communication interface (hereinafter referred to as an internal communication I/F 131), a processor 132, memory 133 and a disk interface (hereinafter referred to as a disk I/F 134). The internal communication I/F 131 communicates with the internal communication I/F 11, the control processor 12, the cache memory 14 and the shared memory 15 and others via the internal switch 16. The processor 132 is a CPU or an MPU. The memory 133 is RAM or ROM. The disk I/F 134 communicates with the storage device 17.

The service processor 18 (SVP) is a computer including a CPU and memory, controls the components of the storage system 10, and performs status monitoring. The service processor 18 (SVP) is coupled communicatively with the communication I/Fs 11, the control processor 12, the disk controllers 13, the cache memory 14 and the shared memory 15, and the internal switch 16 via the internal switch 16, LAN (Local Area Network) and others.

The storage network 5 is, for example, SAN (Storage Area Network), LAN, the Internet, exclusive lines or a public telecommunication network. The communication between the host apparatus 2 and storage systems 10 is performed according to the protocols of TCP/IP, iSCSI, Fibre Channel Protocols, FICON (Fibre Connection) (trademark), ESCON (Enterprise System Connection) (trademark), ACONARC (Advanced Connection Architecture) (trademark), FIBARC (Fibre Connection Architecture), and others.

If a storage network 5 is configured of SAN, the switch 4 is, for example, a Fibre Channel switch (hereinafter referred to as an FC-SW). If a storage network 5 is configured of LAN, the switch 4 is, for example, a switching hub or a router. This embodiment assumes that a storage network 5 is configured of SAN and that a switch 4 is a Fibre Channel switch (FC-SW).

Switch

A hardware example of a switch 4 is shown in FIG. 5. As shown in the figure this switch 4 includes multiple communication ports 41 which receive data, multiple I/F control circuits 42, a switch circuit 43, a processor 44, and memory 45. Note that, though this figure shows the switch 4 including four communication ports 41 as an example, the number of communication ports included in the switch 4 is not limited to this example.

The communication port 41 includes a transceiver with a transmission circuit (Tx) and a reception circuit (Rx) for electrical signals or optical signals. The communication port 41 is configured by using, for example, a GBIC (Gigabit Interface Converter) or an SEP (Small Form Factor Pluggable). The communication port 41 includes a photoelectric converter circuit, a signal multiplexing circuit and a collision converter circuit and others.

The I/F control circuit 42 is installed corresponding with each communication port 41. The I/F control circuit 42 performs data communication between communication ports 41 and the switch circuit 43, controls the communication ports 41 and data errors, and others. The switch circuit 43 selects the path among the communication ports 41. Such path selection is performed, for example, by the crossbar method, the bus method, the ring method or the shared memory method.

The processor 44 is configured by using a CPU, an MPU, a custom LSI (Large-scale Integration), and others. The processor 44, by executing the program stored in the memory 45, achieves the protocol processing function, the routing function, the zoning function or the failure management function. The memory 45 is configured of RAM or ROM (which includes re-writable non-volatile memory such as flash memory). In the memory 45, in addition to the above-mentioned programs, a routing table is stored. In the non-volatile memory of the memory 45, the firmware for achieving the various functions of the switch 4 is stored.

The communication interface (hereinafter referred to as a communication I/F 46) is the interface that complies with the standards of, for example, LAN, RS-232C, USB (Universal Serial Bus) or others, and couples the relevant switch 4 communicatively with external devices. Various types of the operation setting of the switch 4 such as routing or zoning, the setting related to failure management and information acquisition, and other types of setting can be performed by the external devices coupled via the communication I/F 46. The firmware stored in the non-volatile memory can also be re-written via the communication I/F 46.

FIG. 6 is a hardware example of a frame acquisition creation device 50. The frame acquisition creation device 50 includes multiple communication ports 51 which transmit and receive data, a frame acquisition creation circuit 52 coupled to the communication ports 51 (a communication information acquisition unit, a communication information creation unit, and a communication information output unit), memory 53 (communication information storage unit), a communication I/F 54 and a timer 55. The frame acquisition creation circuit 52, the memory 53, the communication I/F 54 and the timer 55 are coupled communicatively via the bus.

The communication port 51 is configured by using, for example, a GBIC or an SFP. The communication port 51 includes a transceiver with a transmission circuit (Tx) and a reception circuit (Rx) for electrical signals or optical signals.

The communication port 51 also includes a photoelectric converter circuit, a signal multiplexing circuit and a collision converter circuit and others.

The frame acquisition creation circuit 52 is configured by using a CPU, an MPU, a custom LSI or others. The frame acquisition creation circuit 52 is coupled communicatively with the communication ports 51. The frame acquisition creation circuit 52 stores the frame which is input to the communication ports 51 in the memory 53. The frame acquisition creation circuit 52 reads the data stored in the memory 53, configures a frame using the read data, and outputs (transmits) the configured frame to a specific communication port 51. Note that the functions of the frame acquisition creation circuit 52 are achieved by the hardware included in the frame acquisition creation circuit 52 or by the frame acquisition creation circuit 52 reading the programs stored in the memory 53 and executing them.

In the memory 53, the programs executed by the frame acquisition creation circuit 52, frame information of the frame acquired by the frame acquisition creation device 52 and others are stored. The communication interface (hereinafter referred to as the communication I/F 54) is, for example, the interface that complies with the standards of, for example, LAN, RS-232C, USB (Universal Serial Bus) or others. The communication I/F 54 couples the frame acquisition creation device 50 communicatively to the management apparatus 60. The timer 55 is a timer equipment configured by using such as an RTC (Real-time Clock). The timer 55 provides information related to time, such as creation of the current time and timing.

Management Apparatus

The management apparatus 60 is configured by using, for example, a personal computer or a workstation. The management apparatus 60 is coupled communicatively to the frame acquisition creation device 50. The management apparatus 60 acquires frame information from the frame acquisition creation device 50, and with reference to the acquired information, controls the frame acquisition creation device 50. Furthermore, the management apparatus 60 includes user interfaces by GUI (Graphic User Interface), CLI (Command Line Interface) and others, for the user to perform a switch 4 test (evaluation). Note that the management apparatus 60 does not necessarily have to be configured separately from the frame acquisition creation device 50, but it can be installed in the same chassis as the frame acquisition creation device 50.

An example of a computer that can be used as a management apparatus 60 (information processing device) is shown in FIG. 7. As shown in the figure, a computer 70 includes a central processing device 71 (a CPU or an MPU), volatile or non-volatile memory 72 (RAM or ROM), a storage device 73 (e.g. a hard disk, a semiconductor storage device (SSD)), an input device 74 including a keyboard and a mouse, an output device 75 including an LCD monitor and a printer and a communication interface (hereinafter referred to as a communication OF 76) such as a NIC. Note that the management apparatus 60 may function as a service processor 18 (SVP).

Switch Evaluation Methods

Next, the methods for evaluating (testing) the switch 4 in the information processing system 1 of the above mentioned configuration is described below. Note that, in the following description, the "S" added to the head of each numeral means a step.

Frame Acquisition

For evaluating the switch 4 in the information processing system 1 configured as above mentioned, the user firstly operates the management apparatus 60 for the frame acquisition creation device 50 to acquire a frame flowing in the switch 4 to be evaluated, extracts information included in the acquired frame (hereinafter referred to as frame information), and stores it in the frame acquisition creation device 50. Note that frame information extracted from the frame includes the information required for re-creating (creating) the acquired frame.

FIG. 8 is an example of a frame flowing in the switch 4. This is the frame complying with the standards of Fibre Channel (hereinafter referred to as an FC frame 800). The FC frame 800 is a variable-length frame whose maximum length is 2148 bytes. As shown in the figure, the FC frame 800 is configured of a start frame 811, a frame header 812 where control information is stated, a data payload 813, a CRC 814 (CRC stands for Cyclic Redundancy Check), and an end frame 815. Note that, among these, the frame header 812 includes the identifier of the communication port which is the transmitting source of the FC frame 800 (SID) and the identifier of the communication port which is the transmitting destination (DID).

FIG. 9 is another example of a frame complying with the standards of Fibre Channel over Ethernet (trademark) (FCoE (Fibre Channel over Ethernet) (trademark)) (hereinafter referred to as an FCoE frame 900). As shown in the figure, the FCoE frame 900 is configured of a Destination MAC Address 911 where the MAC address of the frame's destination is stored, a Source MAC Address 912 where the transmitting source of the data is stored, an IEEE 802.1Q Tag 913, an ET 914 (ET: Ether (trademark) Type), a version code 915, a reserved area 916 (Reserved), an SOF 917 showing the start of the data, an FC frame 918 (same configuration as the FC frame 800 of FIG. 8), an EOF 919 showing the end of the data, a reserved area 920 (Reserved), and the error check information of Ethernet (trademark) 921 (FCS: Frame Check Sequence). Note that, similarly as the FC frame 800, the frame header 812 includes the identifier of the communication port which is the transmitting source of the FC frame 918 (SID) and the identifier of the communication port which is the destination (DID).

FIG. 10 is an example of frame information accumulated and stored in the frame acquisition creation device 50. As shown in the figure, this frame information 1000 includes the time 1011, the input port 1012, the output port 1013 and the frame type 1014. Among these, in the item of the time 1011 the time when the frame acquisition creation device 50 receives the frame (i.e. the time acquired from the timer 55) is stored. In the item of the input port 1012 the identifier of the communication port 41 of the switch 4 where the frame is input (hereinafter referred to as an input port) (such as a DID acquired from the frame) is stored. In the item of the output port 1013 the identifier of the communication port 41 of the switch 4 where the frame is output (hereinafter referred to as an output port) (such as a SID acquired from the frame) is stored.

In the item of the frame type 1014, the information acquired from the data payload 1013 (such as the SCSI (Small Computer System Interface) command type) is stored, for example, "Write" is stored if the frame is related to a data write command, "Read" is stored if the frame is related to a data read command, "Data" is stored if the frame includes write data or the data read from the storage device 17, "X_RDY" or "R_RDY" is stored if the frame shows the transmission capability status, or "Good" is stored if the frame shows the data write status.

FIG. 11 is a flowchart showing a processing (hereinafter referred to as a frame acquisition processing S1100) performed by the management apparatus 60 and the frame acquisition creation device 50 of acquiring the frame input to or output from each communication port 41 of the switch 4 and storing the frame information extracted from the frame in the memory 53. The frame acquisition processing S1100 is described below referring to the figure.

When the user starts the operation for acquiring a frame by using the management apparatus 60 (S1111), the management apparatus 60 transmits a frame acquisition start command to the frame acquisition creation device 50 (S1112). After the frame acquisition start command is transmitted, the management apparatus 60 starts the real-time monitoring for whether the user has performed the operation for completing the frame acquisition (completion operation) (S1113). If the user has performed the completion operation, the management apparatus 60 transmits a frame acquisition completion command to the frame acquisition creation device 50 (S1114).

Meanwhile, the frame acquisition creation device 50, when receiving the frame acquisition start command (S1121), resets the timer (S1122), and starts to receive the frame input by the splitter 7 (or 9) (S1123). The frame acquisition creation device 50, if it receives the frame from the splitter 7 (or 9) (S1123: YES), acquires the current time, the identifiers of the input port and the output port, and the frame type, configures the frame information (S1124 to S1125), and stores the configured frame information in the memory 53 (S1126).

In S1127, the frame acquisition creation device 50 determines whether the frame acquisition completion command from the management apparatus 60 has been received. If the frame acquisition completion command has been received (S1127: YES), the frame acquisition creation device 50 completes the frame acquisition (S1128). If the frame acquisition completion command has not been received (S1127: NO), the processing returns to S1123.

According to the processing above, a frame flowing in the switch 4 which configures the storage system 3 established as a test environment at a user's operational site such as a data center or a vendor company can be easily acquired by using the frame acquisition creation device 50.

Note that, though the splitter 7 is supposed to direct the frame to the frame acquisition creation device 50 in the processing above, for example, it may also be permitted to make the frame acquisition creation device 50 firstly receive the frame sent from the host apparatus 2, and to transmit the frame received from the frame acquisition creation device 50 to the switch 4. This method enables frame information to be acquired without installing the splitter 7. Similarly, by making the frame acquisition creation device 50 receive the frame output by the switch 4 and transmitting the frame received from the frame acquisition creation device 50 to the storage apparatus 10, the splitter 9 is not required.

Frame Creation

The evaluation of the switch 4 in the information processing system 1 is performed by creating a frame using frame information accumulated and stored in the frame acquisition creation device 50 as mentioned above and sequentially input the created frame to the switch 4 according to the time 1011 of the frame information 1000.

FIG. 12A and FIG. 12B are flowcharts showing a processing of creating a frame and inputting the created frame to the switch 4 (hereinafter referred to as frame creation processing S1200). The frame creation processing S1200 is described below referring to these figures.

When the user firstly performs the specific operation to the management apparatus 60 (S1211), the management apparatus 60 acquires frame information from the frame acquisition creation device 50 (S1212) and displays the screen for issuing a frame creation command (hereinafter referred to as a frame acquisition creation command screen 1300) (S1213).

FIG. 13A shows an example of a frame acquisition creation command screen 1300. As shown in the figure, the frame acquisition creation command screen 1300 is configured of a frame information display 1311, a frame acquisition start button 1312, a frame creation start button 1313, and an end button 1314. When starting frame creation, the frame creation start button 1313 is operated. The frame acquisition start button 1312 is operated when starting the above-mentioned frame acquisition. The end button 1314 is operated when ending frame acquisition or creation.

As shown in the figure, the frame information display 1311 includes a time adjust 13112 for adjusting the time to input the frame to the switch 4. The user can change the timing of frame transmission by setting the time in the time adjust 13112. Furthermore, by setting the length of the adjustment time longer than the difference of the transmission time set for the previous and next frames, the order of frame transmission can be changed.

If the frame creation start button 1313 on the frame acquisition creation command screen 1300 is operated (S1214), the management apparatus 60 determines whether the time is input to the time adjust 13112 (S1215). If the time is not input (S1215: NO), the processing proceeds to S1221. If the time is input (S1215: YES), the management apparatus 60 transmits the contents of the time adjust 13112 (hereinafter referred to as adjusted time) (S1216). The frame acquisition creation device 50 adds the transmitted adjusted time to the time 1011 of the relevant frame information 1000 (S1217). Then the processing proceeds to S1221. In S1221, the management apparatus 60 transmits a command to start inputting the frame to the switch 4 to the frame acquisition creation device 50.

In S1222 of FIG. 12B, the frame acquisition creation device 50, when receiving the start command, resets the timer (S1223), determines whether the frames corresponding with all the stored frame information have been transmitted (S1224). If any frames remain not transmitted (S1224: NO), the processing proceeds to S1225. If all the frames have been transmitted (S1224: YES), the processing proceeds to S1230.

In S1225, the frame acquisition creation device 50 compares the contents of the time 1011 of the stored frame information with the current time, and determines whether there is any frame information which has passed the transmission time. If there is any frame information which has passed the transmission time (S1225: YES), the frame acquisition creation device 50 creates a frame based on the frame information which has passed the transmission time (communication information for evaluation) (S1226), and transmits the frame to the switch 4 (S1227). Note that the frame acquisition creation device 50 transmits the frame to the communication port 41 of the switch 4 corresponding with the contents of the created frame.

After transmitting the frame to the switch 4, the frame acquisition creation device 50 reports it to the management apparatus 60 (S1228), and then returns to S1224. The management apparatus 60, when receiving the report of transmitting the frame to the switch 4 (S1232), displays the frame information of the relevant frame (S1233).

FIG. 13B shows an example of the frame information displayed by the management apparatus 60 (hereinafter referred to as transmitted frame information 1350). As shown in the figure, this transmitted frame information 1350 includes display fields: a transmission time 1351 showing the time when the frame acquisition creation device 50 transmits the frame to the switch 4, an input port 1352 showing the identifier of the input communication port 41 stated in the transmitted frame, an output port 1353 showing the identifier of the output communication port 41 stated in the transmitted frame, and a frame type 1354 showing the frame type.

In S1230, the frame acquisition creation device 50 transmits a completion report to the management apparatus 60 that the frames corresponding with all the frame information are transmitted. The management apparatus 60, when receiving the completion report (S1234), displays that effect (S1235).

Note that the frame acquisition creation device 50 can, after transmitting the frame to the switch 4, receive the relevant frame transmitted from the switch 4 via splitters 7 and 8, store it in the memory 53, and perform an evaluation by comparing the transmitted frame with the received frame. It may also be permitted for the frame acquisition creation device 50 to transmit the evaluation result to the management apparatus 60 so that the management apparatus 60 will display the evaluation result. In this way, frame creation and input and the evaluation of the switch 4 can be performed by a single frame acquisition creation device 50.

As mentioned above, the frame acquisition creation device 50, in response to the commands from the management apparatus 60, creates the frame with reference to the stored frame information, and inputs the created frame in the relevant communication port 41 of the switch 4. As mentioned above, since the frame acquisition creation device 50 acquires the frame information of the frame which has actually flowed in the switch 4 at operational sites and others and automatically creates a frame with reference to the acquired frame information, the same frame as at the operational sites and others can be input to the switch 4 in the same timing as at the operational sites and others. Therefore, the events that have occurred at the operational sites and others can be re-created, and causes of the failure and other problems can be analyzed quickly and appropriately. Furthermore, by setting the length of the adjustment time longer than the difference of the transmission time set for the previous and next frames, the order of frame transmission can be changed. In this way, the user can create various test patterns for evaluating the status and performance of the switch 4 easily.

Note that, though the frame has been created after passing the transmission time in the description above (S1225 to S1226), it may also be permitted to create the frame before the transmission time, store it in the memory 53, read it when the transmission time comes, and transmit it to the switch 4. By creating the frame in advance, time lag that might occur due to the load of frame creation at the transmission time can be prevented, and the frame can be transmitted at an even more accurate time.

Example 2

FIG. 14 is a diagram showing the schematic configuration of an information processing system 1 described as Example 2. As shown in the figure, this information processing system 1 includes host apparatuses 2 (servers), storage apparatuses 10, a storage network 5 configured by using a network switch (hereinafter referred to as a switch 4), and a management apparatus 60.

The basic configuration, the usage, and the setting environment, etc. of the host apparatus 2, the storage apparatuses 10, the storage network 5 and the management apparatus 60 are the same as those of the first embodiment. However, unlike the first embodiment, the second embodiment includes the frame acquisition and creation functions in the switch 4. Therefore, the information processing system 1 of the second embodiment does not include the configuration corresponding with the frame acquisition creation device 50 and the splitters 7 and 8 described in the first embodiment.

FIG. 15 shows a hardware example of a switch 4 described as an embodiment 2. As shown in the figure, the switch 4 described in the second embodiment includes, in addition to the configuration of the switch 4 described in the first embodiment, multiple interface selectors (hereinafter referred to as I/F selectors 47) installed corresponding with the communication ports 41, a frame acquisition creation circuit 48 coupled communicatively with the I/F selectors 47 and the switch circuit 43 (a communication information acquisition unit, an evaluation communication information acquisition unit and a communication information acquisition creation circuit) and a timer 49. Note that the frame acquisition creation circuit 48 is coupled communicatively via the bus with a processor 44, memory 45, a timer 49 and a communication I/F 46.

The I/F selectors 47 control the flow (transfer direction) among the communication ports 41, the switch circuit 43, and the frame acquisition creation circuit 48. The I/F selectors 47 have three operational modes that can be switched by the commands sent from the frame acquisition creation circuit 48.

Among these, in the 0-th operational mode (hereinafter referred to as the mode 0), the I/F selectors 47 permit frame transmission between the I/F control circuit 42 (communication port 41) and the switch circuit 43, but do not permit frame transmission/reception between the I/F control circuit 42 (communication port 41) or the switch circuit 43 and the frame acquisition creation circuit 48.

In the first operational mode (hereinafter referred to as the mode 1), the I/F selectors 47 permit frame transmission/reception between the I/F control circuit 42 and the switch circuit 43 and at the same time, provides the duplicated frames of the frames transmitted and received between the I/F control circuit 42 and the switch circuit 43 to the frame acquisition creation circuit 48. However, in the mode 1, it is not permitted to transmit frames from the frame acquisition creation circuit 48 to the I/F selectors 47.

In the second operational mode (hereinafter referred to as the mode 2), the I/F selectors 47 permit frame transmission/reception among the I/F control circuit 42 (communication port 41), the switch circuit 43 and the frame acquisition creation circuit 48.

The frame acquisition creation circuit 48 is configured by using a CPU, an MPU, a custom LSI, or others. The frame acquisition creation circuit 48 includes the function of switching the operational modes of the I/F selectors 47, the functions included in the frame acquisition creation circuit 52 described in the first embodiment 1 such as frame acquisition and creation, and other functions. Furthermore, the frame acquisition creation circuit 48 includes the function of requiring authentication when the user intends to control the frame acquisition creation circuit 48 via the communication I/F 46 (such as setting the operational mode). Note that the functions of the frame acquisition creation circuit 48 are achieved by the hardware included in the frame acquisition creation circuit 48 or by the frame acquisition creation circuit 48 reading the programs stored in the memory 45 and executing them.

The configuration and the functions of the processor 44, the memory 45 and the communication I/F 46 are the same as those described in the first embodiment. The timer 49 is timer circuit configured by using an RTC or others, and it provides information related to time, such as creation of the current time and timing.

Next, the method for evaluating (testing) the switch 4 in the information processing system 1 in the above-mentioned configuration is described below.

Frame Acquisition

FIG. 16A and FIG. 16B are the flowcharts showing a processing performed by the management apparatus 60 and the switch 4 when acquiring the frame input to or output from the communication ports 41 of the switch 4 and accumulating and storing the frame information in the memory 45 (hereinafter referred to as the frame acquisition processing S1600). The frame acquisition processing S1600 is described below referring to these figures.

When the user starts the specified operation for acquiring a frame by using the management apparatus 60 (S1611), the management apparatus 60 transmits a command for switching the operational mode of the I/F selectors 47 to the mode 1 to the processor 44 of the switch 4 (S1612).

After the above-mentioned command is transmitted, the management apparatus 60 starts the real-time monitoring for whether the user has performed the operation for completing the frame acquisition (S1613). If the completion operation has been performed, the management apparatus 60 transmits a frame acquisition completion command to the processor 44 (S1614). The processor 44 when receiving the completion command (S1615), transmits a frame acquisition completion command to the frame acquisition creation circuit 48 (S1616).

The processor 44, when receiving the command for setting to the mode 1 (S1621), transmits a command for switching to the mode 1 (S1622). The frame acquisition creation circuit 48, when receiving the above-mentioned switching command (S1623), sets the operational modes of the I/F selectors 47 to the mode 1 (S1624). Then, the processing proceeds to S1631 in FIG. 16B.

In S1631 of FIG. 16B, the frame acquisition creation circuit 48 resets the timer, and starts to receive the frame (duplication) input by the I/F selectors 47 (S1632). The frame acquisition creation circuit 48, if it receives the frame (S1632: YES), acquires the current time from the timer 49 (S1633), acquires the identifier of the input port (information stated in the input port 1012) and the identifier of the output port (information stated in the output port 1013) from the frame header 812 (S1634), and with reference to the acquired information, stores the frame information acquired from the frame in the memory 45 (S1635).

In S1636, the frame acquisition creation circuit 48 determines whether it has received the frame acquisition completion command from the management apparatus 60. If it has received the frame acquisition completion command (S1636: YES), the frame acquisition creation circuit 48 completes the frame acquisition (S1637), and sets the operational modes of the I/F selectors 47 to the mode 0 (S1638). If it has not received the frame acquisition completion command (S1636: NO), the processing returns to S1632.

According to the processing above, a frame flowing in the switch 4 which configures the storage system 3 established as a test environment at a user's operational site such as a data center or a vendor company can be easily acquired by using the switch 4 which includes the frame acquisition creation circuit 48. Furthermore, unlike the first embodiment, as the frame acquisition system is installed in the switch 4, the splitter 7 (or 9) is not required.

Frame Creation

FIG. 17A and FIG. 17B are the flowcharts showing a processing related to frame creation (hereinafter referred to as the frame creation processing S1700). The frame creation processing S1700 is described below referring to these figures.

The processing from S1711 to S1715 in FIG. 17A is the same as S1211 to S1215 in FIG. 12A described in the first embodiment. In S1716, the management apparatus 60 transmits the adjusted time to the processor 44 of the switch 4. The processor 44 adds the received adjusted time to the time 1011 of the relevant frame information 1000 (S1718). Note that this processing (S1718) can be performed by the frame acquisition creation circuit 48. In S1721, the management apparatus 60 transmits a command for starting the frame input to the processor 44 of the switch 4.

The processor 44, when receiving the frame input start command (S1722), transmits a command for switching the operational mode to the mode 2 to the frame acquisition creation circuit 48 (S1723). The frame acquisition creation circuit 48, when receiving the switching command (S1724), sets the operational modes of the I/F selectors 47 to the mode 2 and starts frame creation and input (S1725).

As shown in FIG. 17B, the frame acquisition creation circuit 48 firstly resets the timer (S1731), determines whether the frames corresponding with all the stored frame information have been transmitted (S1732). If any frames remain not transmitted (S1732: NO), the processing proceeds to S1733. If all the frames have been transmitted (S1732: YES), the processing proceeds to S1751.

In S1733, the frame acquisition creation circuit 48 compares the contents of the time 1011 of the stored frame information with the current time, and determines whether there is any frame information which has passed the transmission time. If there is any frame information which has passed the transmission time (S1733: YES), the frame acquisition creation circuit 48 creates a frame based on the frame information which has passed the transmission time (communication information for evaluation) (S1734).

Next, with reference to the created frame, the frame acquisition creation circuit 48 determines an I/F selector 47 to be the destination of the relevant frame and another I/F selector 47 to be the transmission source of the relevant frame (i.e. the I/F selector 47 which returns the frame to the frame acquisition creation circuit 48) (S1735).

At this time, the I/F selectors 47 to be the destination and the transmitting source are determined by, for example, referring to the SID or the DID stated in the frame header 812 of the created frame. For example, if the SID is "Port 0" and the DID is "Port 2," the I/F selector 47 to be the destination of the created frame is an "I/F selector 0" and the I/F selector 47 to be the transmission source is an "I/F selector 2."

Next, the frame acquisition creation circuit 48 determines the data transfer direction of the I/F selectors 47 to be the destination and the transmitting source determined in S1735 (S1736). For example, if the destination I/F selector 47 has been determined to be the "I/F selector 0" and the transmitting source I/F selector 47 has been determined to be the "I/F selector 2" in S1736, the data transfer direction of the I/F selector 0 is set to the direction from the relevant I/F selector 0 to the switch circuit 43, and the data transfer direction of the I/F selector 2 is set to the direction from the OF selector 2 to the frame acquisition creation circuit 48.

The frame acquisition creation circuit 48 transmits the created frame to the destination I/F selector 47, and waits for the frame to be returned from the transmitting source (S1737). The frame acquisition creation circuit 48, when receiving the returned frame (S1738), evaluates the switch circuit 43 by comparing the frame transmitted to the destination I/F selector 47 with the frame received from the transmitting source (S1739), and transmits the evaluation result to the management apparatus 60 (S1740). Note that the evaluation result can be transmitted via the processor 44. After S1740, the processing returns to S1732.

The management apparatus 60, when receiving the evaluation result (S1741), displays the result (S1742). Note that, if the frame cannot be received even after a specific period of time waiting for the frame to be arrived, it may be considered to be a timeout and the forced transition to the processing of a following frame may be permitted. In that case, the process is stated in the evaluation result.

In S1751, the frame acquisition creation circuit 48 transmits the frame creation (evaluation) completion report to the management apparatus 60. Note that the transmission of the completion report to the management apparatus 60 can be performed via the processor 44. Next, the frame acquisition creation circuit 48 sets the operational mode of the I/F selectors 47 to the mode 0 (S1752). The management apparatus 60, when receiving the completion report (S1753), displays the status (S1754).

FIG. 18 is an example of an evaluation result displayed by the management apparatus 60. As shown in the figure, this evaluation result 1800 includes, for each frame transmitted by the frame acquisition creation circuit 48, the columns of the time when the frame acquisition creation circuit 48 has transmitted the frame to the destination I/F selector 47 (transmission time 1811), the frame acquisition creation circuit 48 has received the frame returned from the transmitting source I/F selector 47 (reception time 1812), the identifier of the input communication port 41 stated in the frame (input port 1813), the identifier of the output communication port 41 stated in the frame (output port 1814), the frame type (frame type 1815), and the evaluation result (evaluation result 1816). In the evaluation result 1816, for example, if the contents of the transmitted frame matches the contents of the received frame, "OK" is specified, "Error" if they do not, or "Time-out" if the transmitted frame fails to be received.

As described above, according to the switch 4 of the second embodiment, the switch 4 which configures the storage system 3 established as a test environment at a user's operational site such as a data center or a vendor company can be easily evaluated. Furthermore, the same frame as at operational sites and others can be input to the switch 4 in the same chronological order as at the operational sites and others, and the switch 4 can be evaluated. In this way, according to the switch 4 of the second embodiment, the situation where the switch 4 is at operational sites and others can be recreated easily, and causes of the failure and other problems can be analyzed quickly and appropriately. Furthermore, by setting the adjustment time larger than the difference of the transmission time set for the previous and next frames, the order of frame transmission can be changed, and the user can create various frame test patterns easily for evaluating the status and performance of the switch 4.

Note that, similarly as in the first embodiment, instead of creating a frame after the transmission time, it may be permitted to create a frame before the transmission time, store it in the memory 45, read it when the transmission time comes, and transmit it to the I/F selector 47. In this way, time lag that might occur due to the load of frame creation at the transmission time can be prevented, and the frame can be input to the switch circuit 43 at an even more accurate time.

It is to be understood that above-described embodiments are intended for ease of understanding the present invention and by no means limited to the particular constructions herein disclosed and/or shown in the drawing, but also comprises any changes, modifications or equivalents within the spirit and scope hereof.

The invention claimed is:

1. A communication information acquisition creation system for evaluating a network switch having a plurality of communication ports, the network switch being configured to output first communication information to a second communication device coupled to a second one of the communication ports, the first communication information being from a first communication device and input to a first one of the communication ports, the system comprising:

a communication information acquisition unit configured to acquire the first communication information input to the first communication port and second communication information input to the second communication port;

a communication data storage unit configured to acquire, from the first communication information and the second communication information respectively, time information indicating time of acquisition of the first and second communication information, transmitting source information indicating transmission sources of the first and second communication information, and transmitting destination information indicating transmission destinations of the first and second communication information;

and to store communication data correlating the time information, the transmitting source information, and the transmitting destination information;

a communication information creation unit configured to create, according to the communication data, communication information for evaluation to be input to the network switch; and a communication information output unit configured to output the created communication information for evaluation to a communication port of the network switch specified by the transmitting source information and the transmitting destination information in the order determined according to the time information;

wherein the communication information acquisition unit is further configured to acquire the first communication information from a first signal splitter coupled to the first communication device and the first communication port, and the second communication information from a second signal splitter coupled to the second communication device and the second communication port.

2. A communication information acquisition creation system according to claim 1, wherein the first communication device is a host apparatus, the second communication device is a storage apparatus that the host apparatus accesses, and the network switch is a constituent component on a network communicatively coupling the host apparatus and the storage apparatus.

3. A communication information acquisition creation system according to claim 1, wherein the communication information is a data frame defined in a communication protocol with which the first and the second communication devices communicate.

4. A communication information acquisition creation system according to claim 3, wherein the communication protocol is Fibre Channel (FC) or Fibre Channel over Ethernet (FCoE).

5. A network switch comprising:

a plurality of communication ports;

a switch circuit configured to select one of a plurality of paths between the communication ports, the network switch being configured to output first communication information to a second communication device coupled to a second one of the communication ports, the first communication information being from a first communication device and input to a first one of the communication ports;
a communication information acquisition unit configured to acquire the first communication information input to the first communication port and second communication information input to the second communication port;
a communication data storage unit configured to acquire, from the first communication information and the second communication information respectively, time information indicating time of acquisition of the first and second communication information, transmitting source information indicating transmission sources of the first and second communication information, and transmitting destination information indicating transmission destinations of the first and second communication information;
and to store communication data correlating the time information, the transmitting source information, and the transmitting destination information;
a communication information creation unit configured to create, according to the communication data, communication information for evaluation to be input to the switch circuit; and
a communication information output unit configured to output the created communication information for evaluation to the switch circuit as specified by the transmitting source information and the transmitting destination information in the order determined according to the time information;
wherein the communication information acquisition unit is further configured to acquire the first communication information from a first signal splitter coupled to the first communication device and the first communication port, and the second communication information from a second signal splitter coupled to the second communication device and the second communication port.

6. The network switch according to claim 5, further comprising:
a communication information acquisition creation circuit configured to acquire the first and second communication information input to the first and second communication ports, respectively; to create the communication information by the communication information creation unit; and to output the created communication information for evaluation to the switch circuit by the communication information output unit; and
a selector configured to control a data flow between the communication port, the communication information acquisition creation circuit, and the switch circuit according to an instruction from the communication information acquisition creation circuit, the selector being provided to each of the communication ports,
wherein, when the communication information acquisition creation circuit acquires the communication information, the communication information acquisition creation circuit controls the selector so that the communication information to be input to the communication port is output to both the communication information acquisition creation circuit and the switch circuit, and, when the communication information acquisition creation circuit outputs the communication information for evaluation to the switch circuit, the communication information acquisition creation circuit controls the selector so that the communication information to be input to the communication port is output to the switch circuit.

7. The network switch according to claim 5, further comprising:
an evaluation communication information acquisition unit configured to acquire the communication information for evaluation output to the switch circuit by the communication information output unit,
wherein, when the evaluation communication information acquisition unit acquires the communication information for evaluation, the evaluation communication information acquisition unit controls the selector so that the communication information for evaluation output from the switch circuit is output to the communication information acquisition creation circuit.

8. The network switch according to claim 7,
wherein the communication information acquisition creation circuit is further configured to compare the communication information for evaluation output to the switch circuit by the communication information output unit with the communication information for evaluation output from the switch circuit, and to store a result of the comparison as an evaluation result.

9. The network switch according to claim 8, further comprising:
a communication interface configured to couple a user interface to the network switch, to enable the communication information output unit to reference the evaluation result.

10. The network switch according to claim 5, further comprising:
a communication interface configured to couple a user interface to the network switch, to change a timing when the communication information output unit transmits the communication information for evaluation to the communication port.

11. The network switch according to claim 5,
wherein the first communication device is a host apparatus, the second communication device is a storage apparatus that the host apparatus accesses, and the network switch is a constituent component on a network communicatively coupling the host apparatus and the storage apparatus.

12. A method for evaluating a network switch having a plurality of communication ports, the network switch being configured to output first communication information to a second communication device coupled to a second one of the communication ports, the first communication information being from a first communication device and input to a first one of the communication ports, comprising:
acquiring the first communication information input to the first communication port from a first signal splitter coupled to the first communication device and the first communication port;
acquiring second communication information input to the second communication port from a second signal splitter coupled to the second communication device and the second communication port;
acquiring, from the first communication information and the second communication information respectively, time information indicating time of acquisition of the first and second communication information, transmitting source information indicating transmission sources of the first and second communication information, and transmitting destination information indicating transmission destinations of the first and second communication information, and storing communication data correlating the time information, the transmitting source information, and the transmitting destination information;

creating, according to the communication data, communication information for evaluation to be input to the network switch; and inputting the created communication information for evaluation to a communication port of the network switch specified by the transmitting source information and the transmitting destination information in the order determined according to the time information.

13. The method for evaluating a network switch according to claim 12, wherein the first communication device is a host apparatus, the second communication device is a storage apparatus that the host apparatus accesses, and the network switch is a constituent component on a network communicatively coupling the host apparatus and the storage apparatus.

* * * * *